(12) United States Patent
Schaefer et al.

(10) Patent No.: US 11,693,954 B2
(45) Date of Patent: *Jul. 4, 2023

(54) SYSTEM AND METHOD FOR CONTROLLING INTER-APPLICATION ASSOCIATION THROUGH CONTEXTUAL POLICY CONTROL

(71) Applicant: MICROSOFT TECHNOLOGY LICENSING, LLC, Redmond, WA (US)

(72) Inventors: Stuart Schaefer, Marblehead, MA (US); John Sheehan, Somerville, MA (US)

(*) Notice: Subject to any disclaimer, the term of this patent is extended or adjusted under 35 U.S.C. 154(b) by 14 days.

This patent is subject to a terminal disclaimer.

(21) Appl. No.: 17/491,937

(22) Filed: Oct. 1, 2021

(65) Prior Publication Data
US 2022/0019655 A1 Jan. 20, 2022

Related U.S. Application Data

(60) Continuation of application No. 16/296,708, filed on Mar. 8, 2019, now Pat. No. 11,138,309, which is a
(Continued)

(51) Int. Cl.
*G06F 21/53* (2013.01)
*G06F 9/445* (2018.01)
(Continued)

(52) U.S. Cl.
CPC .......... *G06F 21/53* (2013.01); *G06F 9/44505* (2013.01); *G06F 9/545* (2013.01);
(Continued)

(58) Field of Classification Search
CPC ...... G06F 21/53; G06F 9/44505; G06F 9/545; G06F 21/62; G06F 21/6281; G06F 2209/542; G06F 9/54; G06F 9/46
See application file for complete search history.

(56) References Cited

U.S. PATENT DOCUMENTS 5,752,005 A 5/1998 Jones
5,961,582 A 10/1999 Gaines
(Continued)

FOREIGN PATENT DOCUMENTS

JP 2002358206 A 12/2002
JP 2004520641 A 7/2004
(Continued)

OTHER PUBLICATIONS

"Summons to attend oral proceedings R.115(1) issued in European Patent Application No. 05776626.3", Mailed Date: May 27, 2021, 11 Pages.
(Continued)

*Primary Examiner* — Umut Onat
*Assistant Examiner* — Phuong N Hoang
(74) *Attorney, Agent, or Firm* — Workman Nydegger

(57) ABSTRACT

A method for controlling the interoperation of a plurality of software applications and resources includes intercepting communications from a first application to a second application or resource, directing the communication to a context management system, generating a candidate list of contexts for the communication, evaluating the candidate list according to at least one policy defined for these contexts to identify the resultant action and namespace for the communication, and performing the action as defined by the policies within the identified namespace. The method further includes tracking one or more versions of the second application, as well as tracking an evolution of application and/or resource names. The method further includes identifying one or more operations associated with a context on the candidate list, and executing the identified operations prior to a further communication.

18 Claims, 12 Drawing Sheets

Related U.S. Application Data continuation of application No. 13/154,323, filed on Jun. 6, 2011, now Pat. No. 10,229,265, which is a division of application No. 11/191,595, filed on Jul. 28, 2005, now Pat. No. 7,962,918.

(60) Provisional application No. 60/598,234, filed on Aug. 3, 2004.

(51) Int. Cl.
*G06F 9/54* (2006.01)
*G06F 21/62* (2013.01)

(52) U.S. Cl.
CPC .......... *G06F 21/62* (2013.01); *G06F 21/6281* (2013.01); *G06F 2209/542* (2013.01)

(56) References Cited

U.S. PATENT DOCUMENTS

| | | | |
|---|---|---|---|
| 6,356,915 B1 | 3/2002 | Chtchetkine | |
| 10,229,265 B2 * | 3/2019 | Schaefer | G06F 9/545 |
| 2002/0019941 A1 | 2/2002 | Chan et al. | |
| 2002/0073236 A1 * | 6/2002 | Helgeson | G06F 16/258 |
| | | | 709/217 |
| 2002/0174215 A1 * | 11/2002 | Schaefer | G06F 9/54 |
| | | | 709/224 |
| 2003/0014521 A1 | 1/2003 | Elson et al. | |
| 2003/0033441 A1 | 2/2003 | Forin et al. | |
| 2003/0229900 A1 * | 12/2003 | Reisman | H04N 21/4755 |
| | | | 348/E7.071 |
| 2004/0123118 A1 * | 6/2004 | Dahan | G06F 21/74 |
| | | | 712/E9.082 |
| 2005/0114870 A1 | 5/2005 | Song et al. | |

FOREIGN PATENT DOCUMENTS

| | | |
|---|---|---|
| JP | 2004533054 A | 10/2004 |
| WO | 2002093369 A1 | 11/2002 |

OTHER PUBLICATIONS

Office Action Issued in European Patent Application No. 05776626. 3, dated Feb. 7, 2008, 6 Pages.
"Office Action Issued in European Patent Application No. 05776626. 3", dated Nov. 14, 2011, 5 Pages.
"Summons to Attend Oral Proceedings Issued in European Patent Application No. 05776626.3", Mailed Date: Oct. 14, 2014, 10 Pages.
Office Action Issued in Korean Patent Application No. 10-2007-7002729, dated Aug. 22, 2011, 5 Pages.
"First Office Action Issued in Chinese Patent Application No. 200580026131.6", dated May 23, 2008, 7 Pages.
"Office Action Issued in Japanese Patent Application No. 2007-524863", dated Jun. 3, 2011, 10 Pages.
"Notice of Allowance Issued in Japanese Patent Application No. 2007-524863", dated Jun. 5, 2012, 6 Pages.
892 Form issued in U.S. Appl. No. 16/296,708 dated May 22, 2020.
892 Form issued in U.S. Appl. No. 16/296,708 dated Nov. 30, 2020.
892 Form issued in U.S. Appl. No. 16/296,708 dated Jun. 2, 2021.
Osman et al., "The Design and Implementation of Zap: A System for Migrating Computing Environments", pp. 1-16. (Year: 2002).
King et al., "Operating System Support for Virtual Machine", pp. 1-14. (Year: 2003).

* cited by examiner

SYSTEM AND METHOD FOR CONTROLLING INTER-APPLICATION ASSOCIATION THROUGH CONTEXTUAL POLICY CONTROL

CROSS-REFERENCE TO RELATED APPLICATIONS

This application is a continuation of U.S. patent application Ser. No. 13/154,323, filed Jun. 6, 2011, which is a divisional of U.S. patent application Ser. No. 11/191,595, filed Jul. 28, 2005, which claims priority to provisional application Ser. No. 60/598,234, filed on Aug. 3, 2004, the contents of which are incorporated by reference herein in their entirety.

TECHNICAL FIELD

The present invention relates to computer software, and more particularly to operating system software.

BACKGROUND

In many environments, but particularly in environments where an application is delivered via a network, the most important feature is an ability to run applications on the fly, without a complex installation. Typically, in certain prior art systems, great pains were taken to modify a client system to appear as if a program was installed, or to actually install the software itself, and then back out these modifications to restore the original configuration. In doing this, multiple problems present themselves: conflicts between an application and the computer's current configuration, multiple instances of the same or different applications, complexity of the back out process requires an application to be put through a rigorous process to ensure all of its modifications can be accounted for, and the use of shared files and system components by multiple applications complicates back out and the installation process.

Within many application execution environments, it is desirable to segregate applications to prevent systemic failures due to sociability and versioning problems. Segregation, however, could prevent these programs from interoperating unless configured to do so. This problem is particularly acute in "virtual installation" environments, whereby software applications are executed within an operating system, but are not in fact installed in that operating system (OS), or in some cases are installed and removed on the fly.

SUMMARY

The embodiments in accordance with the invention are directed to facilitating inter-application communication and association in the presence of an environment that was either not designed to do so, or through default behavior, requires additional system configuration. The embodiments retain the original premise of the system, providing runtime segregation of applications, but allowing interoperability under strict administration and operating policies.

In accordance with one aspect of the invention, a method for controlling the interoperation of a plurality of software applications and resources includes intercepting communications from a first application to a second application or resource, directing the communication to a context management system, generating a candidate list of contexts for the communication, evaluating the candidate list according to at least one policy defined for these contexts to identify the resultant action and namespace for the communication, and performing the action as defined by the policies within the identified namespace. The method further includes tracking one or more versions of the second application, as well as tracking an evolution of application and/or resource names. The method further includes identifying one or more operations associated with a context on the candidate list, and executing the identified operations prior to a further communication. The candidate list is generated from one or more distributed contexts. These communications include at least one of inter-process communications, operating system calls, API calls or library calls. The context includes at least one of a global context, managed context, local system context, system virtual context, vendor context, user context, session context, shared context, or isolated context. The policy includes at least one of a match mnemonic for identifying when the policy applies, a plurality of request correlation parameters and rules for applying the policy.

In accordance with another aspect of the invention, a method for defining alternate namespaces for applications to be executed within other applications or resources, includes intercepting calls for a resource of a common name, identifying a target namespace for the call, translating the common name into a local name usable by applications within that namespace, and providing access to the resource identified by that local name. The method further includes tracking one or more versions of applications, as well as tracking an evolution of application or resource names. The local name can also be translated into an absolute name such that access to the resource identified by the local name can be facilitated to a resource identified by a different local name in an alternate namespace. The step of identifying the target namespace includes one or more distributed queries, wherein at least one query for the target namespace may be performed to a management system which tracks namespace common to one or more systems.

In accordance with another aspect of the invention, a system for controlling the interoperation of a plurality of software applications and resources, includes a context management system to generate a candidate list of contexts for a communication, a policy engine to evaluate the candidate list according to at least one policy defined for the contexts and the policy engine further identifying the resultant action and namespace for the communication, and a virtual environment manager to direct the communication from a first application to a second application or resource to the context management system, the virtual environment manager receiving instructions indicative of the resultant action as defined by the at least one policy within the identified namespace.

The present invention provides a system for creating an application software environment without changing an operating system of a client computer, the system comprising an operating system abstraction and protection layer, wherein said abstraction and protection layer is interposed between a running software application and said operating system, whereby a virtual environment in which an application may run is provided and application level interactions are substantially removed. Preferably, any changes directly to the operating system are selectively made within the context of the running application and the abstraction and protection layer dynamically changes the virtual environment according to administrative settings. Additionally, in certain embodiments, the system continually monitors the use of shared system resources and acts as a service to apply and remove changes to system components.

Thus, for example, in embodiments within Windows-based operating systems, and wherein all operations to the Windows Registry are through the Win32 API, the system preferably provides a means for hooking functions, whereby each time said functions are invoked another function or application intercepts the call, and the system most preferably hooks each appropriate API function to service a request whether made by an application run from a server or if made by an application against a configuration key being actively managed.

The foregoing and other features and advantages of the invention will be apparent from the following more particular description of embodiments of the invention, as illustrated in the accompanying drawings in which like reference characters refer to the same parts throughout the different views.

DETAILED DESCRIPTION OF ILLUSTRATIVE EMBODIMENTS

Figure 1:
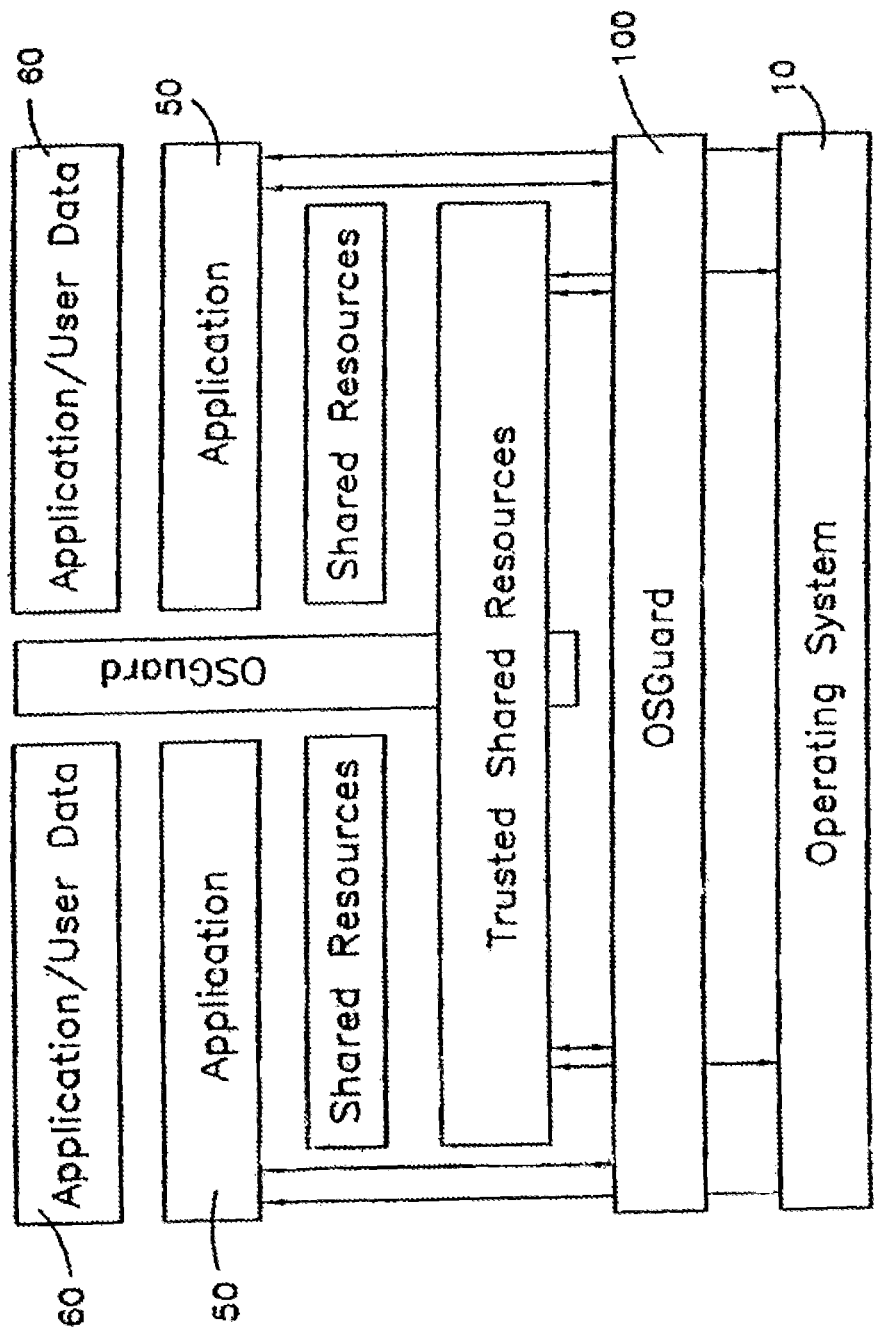
FIG. 1 is a block diagram schematic showing the relative relationship of the present invention, an operating system and a software application.

Referring now to FIG. 1, there is illustrated a block diagram schematic showing the relative relationship of the present invention, an operating system and a software application. Preferred embodiments of the present invention provide an operating system abstraction and protection layer 100 denominated an "Operating System Guard." Internally, many operating systems 10 provide fault domains to protect applications 50 from affecting each other when run. However, shared system resources and many other operating system features allow this protection domain to be compromised. An operating system abstraction and protection layer 100 will provide an additional, programmatically controlled barrier between applications 50 to remove most application level interactions. Disposed between the application 50 and operating system 10 the operating system abstraction and protection layer 100 selectively allows changes directly to the operating system 10, versus containing the change within the context of the running application. For one example, in Windows-based systems, all operations to the Windows Registry are typically done through the Win32 APL. As explained below, system functions like QueryRegEx and GetProfileString can be hooked so that each time they are invoked, another function or application intercepts the call. The Operating System Guard 100 of the present invention will hook each appropriate API function to service the request, if made by an application being actively managed or if made by an application against a configuration item being actively managed. In this way, unless explicitly configured to do so, the embodiments of the present invention can create the application environment without making any actual changes to the end-users system. Also, any modifications made at run-time by the application can be persisted or removed easily.

As used herein the term "Operating System Guard" defines a layer between a running application and the operating system of a target computer or client computer that provides a virtual environment in which an application may run. This virtual environment has several purposes. First, it prevents a running application from making changes to the client computer. If an application attempts to change underlying operating system settings of a client computer, such settings are protected and only "made" in the virtual environment. For example, if an application attempts to change the version of a shared object like MSVCRT.DLL, this change is localized to the application and the code resident on the client computer is left untouched.

Second, an embodiment of the invention presents an environment to a running application that appears to be an installation environment without performing an installation, and is thus a "pseudo installation" or installation-like." All of the settings are brought into a virtual environment at the time the application being served runs, or just-in-time when the application needs the particular setting. For example, if a computer program such as Adobe Photoshop® expects to see a set of Windows Registry entries under HKEY_LOCAL_MACHINE\Software\Adobe and they are not there on the client computer since Photoshop was never installed, a system made in accordance with this aspect of the present invention will "show" those registry entries to the Photoshop programming code exactly as if they were resident on the client computer.

Next, an embodiment of the invention prevents information that may exist on the client/users machine from interfering with or modifying the behavior of an application. For example, if the user has already existing registry entries under:

HKEY_LOCAL_MACHINE\Software\Adobe for an older version of Photoshop, but now wishes to operate a newer version, these entries can be hidden from the new application to prevent conflicts.

Finally, an embodiment of the present invention unlocks application behavior that may not exist as the application is currently written. It does this through the ability to dynamically change the virtual environment according to administrative settings. For example, in a typical instance of an enterprise software application, a client application may expect to read a setting for the address of the database to which the user should connect from a setting in the registry. Because this registry key is often stored in HKEY_LO-CAL_MACHINE, the setting is global for the entire client computer. A user can only connect to one database without reinstalling the client, or knowing how to modify this registry key, and doing so each time they wish to run the application. However, by implementing the present invention, two instances of the application may now run on the same client computer, each connecting to a different database.

Contexts

Figure 2:
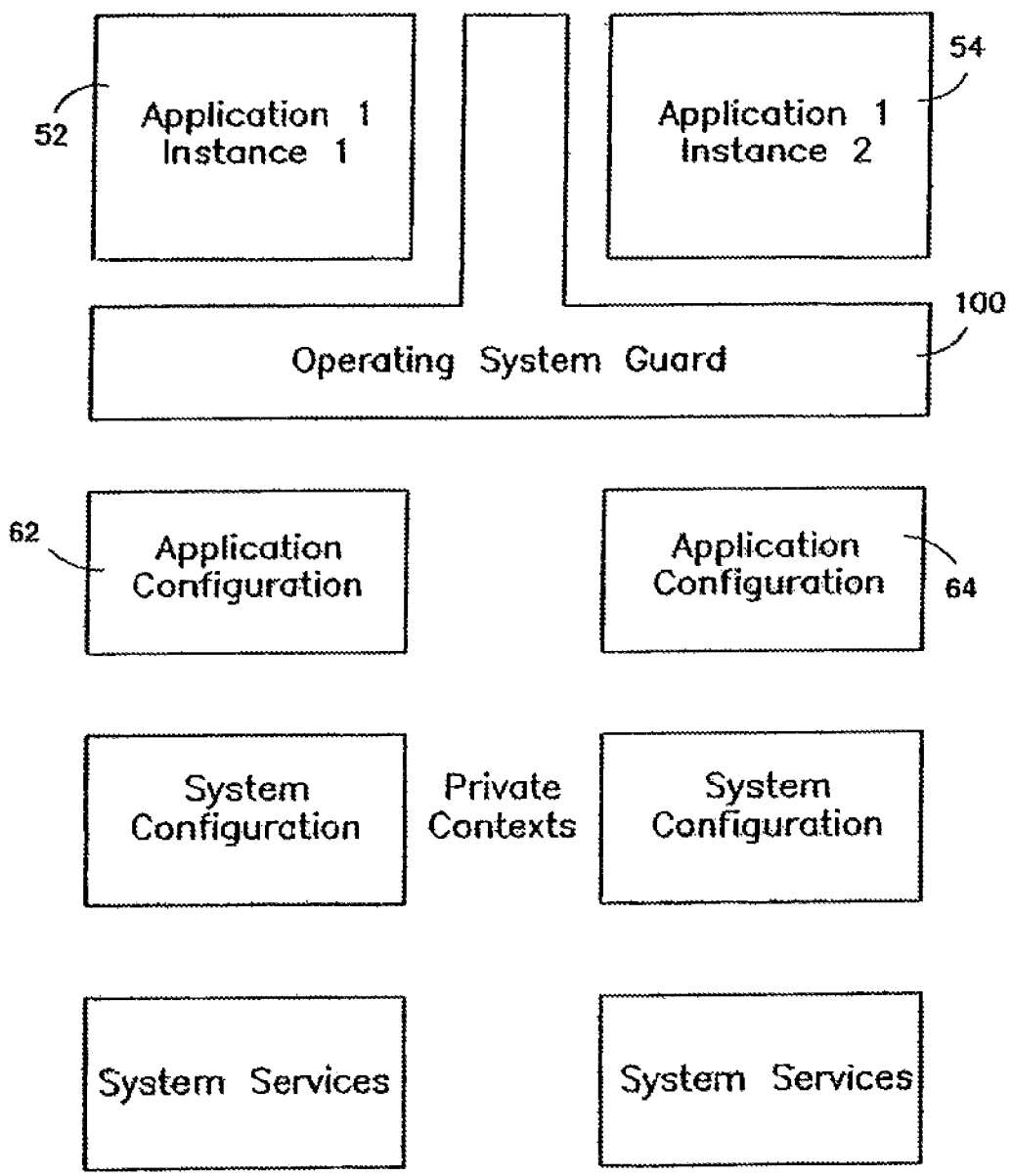
FIG. 2 is a block diagram schematic showing two applications running with private contexts and services.

In providing this functionality, each application is able to run in a private context within the system. To the application, it has its own private view of what the system looks like and its behavior. The embodiments of the present invention provide this by its inherent nature. Referring to FIG. 2, two separate applications 52, 54, or two instances of the same application (50 illustrated in FIG. 1), can be provided private contexts in which they will appear to have separate or differing copies of system services, configuration and data. In the preferred embodiment, this is the default behavior of the system.

Figure 3:
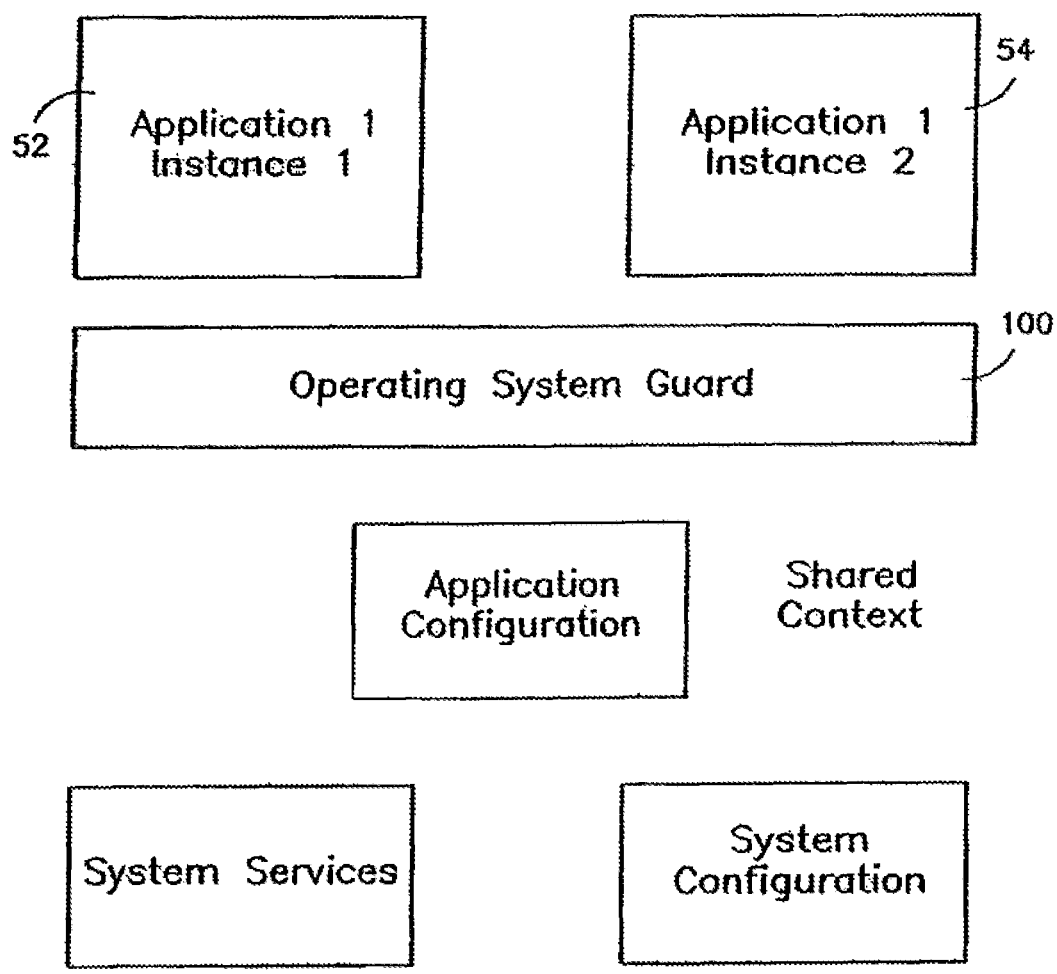
FIG. 3 is a block diagram schematic showing two applications running while the operating system provides shared views of the system resources.

By extending this concept, the Operating System Guard 100 of an embodiment of the present invention can also provide shared, controlled contexts in which two or more applications 52, 54 can share some or all of their virtual settings. This is important for application suites such as Microsoft Office, or for applications that perform differently in the presence of other applications. For example, many applications use Microsoft Word as an engine for doing Mail Merge or document creation functionality. The application must know about the installation or presence of Word and be able to tap into its functions. In the preferred embodiment, two instances of the same application will share a single context by default, while two separate applications will maintain private contexts. Referring to FIG. 3, the two applications 52, 54 can run while the Operating System Guard 100 provides a shared view of the available system resources.

Design

Figure 4:
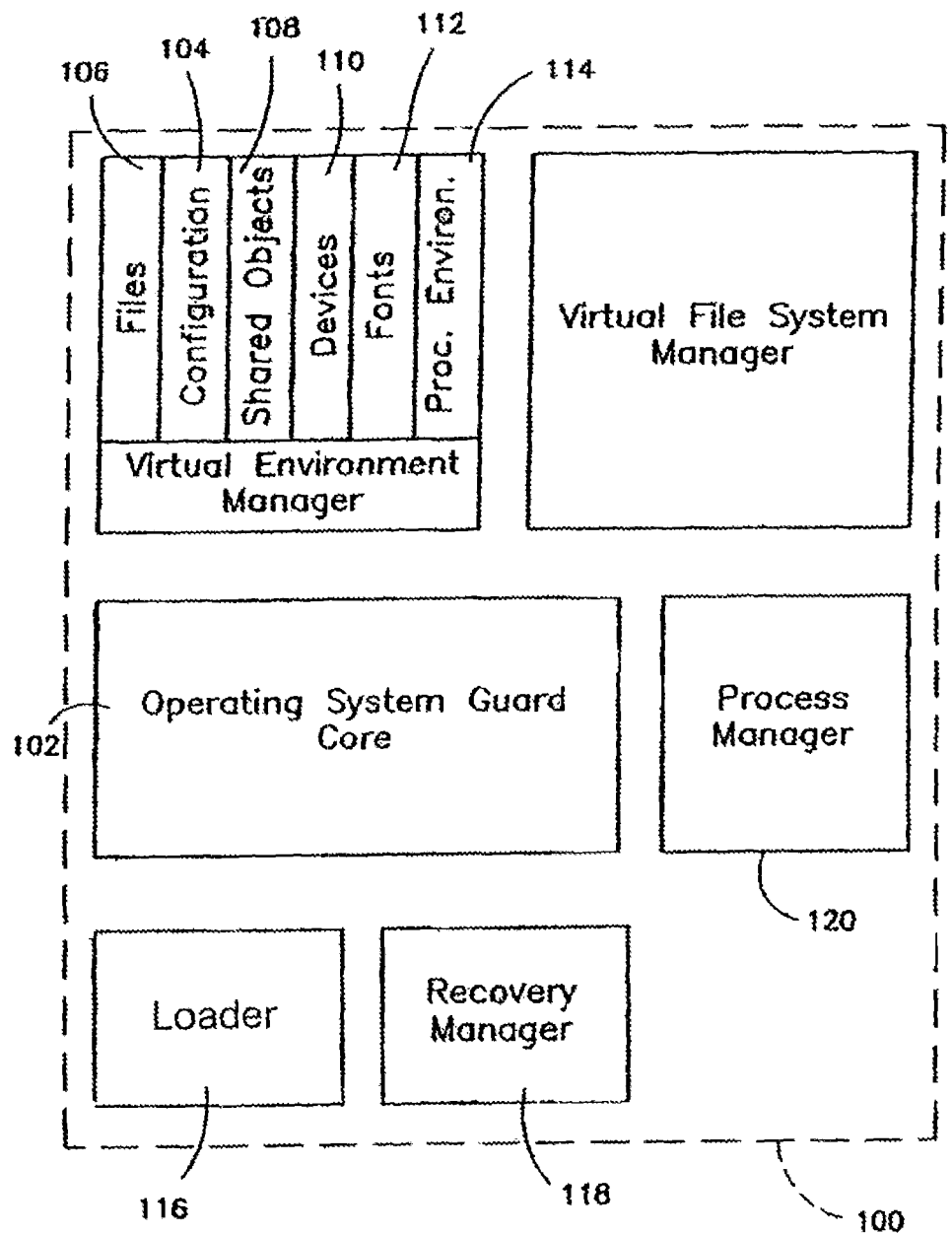
FIG. 4 is a block diagram schematic showing an operating system guard and subsystems.

As illustrated in FIG. 4, the Operating System Guard is comprised of the following subsystems: core 102, configuration manager 104, file manager 106, shared object manager 108, device manager 110, font manager 112, process manager 120, process environment manager 114, loader 116, and recovery manager 118. With the exception of the core 102, the process manager 120, and the loader 116, all other subsystems are elements of the Virtualization System described in further detail hereinafter. The core 102 is primarily responsible for managing applications and their context as defined by the configuration files.

The process manager 120 provided by the Operating System Guard allows the core 102 to be informed of any process or thread event that may be of interest. It also provides an abstraction layer to the operating system-dependent implementations for managing a process space and handling thread processing. Processes may be grouped together into application bundles. An application bundle is a group of processes which all share their virtual resources with each other. For example, Microsoft Word and Microsoft Excel may want to share the virtual registry and virtual file system to be able to work together as an application suite. The process manager 120 calls these application bundles "applications". The information about an application exists until the process manager 120 is told to release the application. If another process needs to be loaded into the application bundle, it may do so as long as the application has not been released.

The loader subsystem 116 of an embodiment of the present invention is used to allow virtual environments to be transferred into and out of the running system. Each of the Virtualization Subsystems is capable of serializing its configuration for the loader 116, and retrieving it through the reverse process. In addition, the loader 116 is capable of staged loading/unloading and combining the results of individual stages into one single environment description.

Registry and Configuration

Applications require varying amounts of configuration information to operate properly. Anywhere from zero to thousands of configuration records exist for which an application can read its configuration. On Windows, there are two common places for configuration information, the Windows Registry and system level initialization files win.ini and system.ini. In addition, the \WINDOWS\SYSTEM directory is a common place for applications to write application specific configuration or initialization files. Applications will also use configuration or data files in their local application directories to store additional configuration information. Often this information is difficult to deal with, as it is in a proprietary format. On platforms other than Windows, there is no equivalent of the Registry, but common directories exist for configuration information. X Windows has an app-defaults directory. Macintosh has the System Folder, and other operating systems will have corresponding elements. It is important to note that on most UNIX systems, each individual application 52, 54 will most often store its own configuration 62, 64 locally, as seen in FIG. 2.

An embodiment of the present invention includes a virtual Windows Registry component, which provides a full function registry to an application, but prevents modification to the underlying system registry. All keys that an application expects to access will be present, but may only exist in the virtual registry. In this way, the Operating System Guard 100 of the present invention and the Windows Registry form a two-stage process for accessing the registry. If an application needs access to a key, it will query the Registry. The Operating System Guard will respond with the key and its value if it knows it. Otherwise, it will allow the request to pass through to the Windows Registry. If an attempt is made to modify the value, the Operating System Guard will allow the modification to occur to itself only. The next time the application accesses the key, it will be present in the Operating System Guard and the request will not flow through to the real Registry, leaving it untouched.

The keys that the Operating System Guard uses are specified in three separate sections. These Operating System Guard keys are specified as commands in these sections to modify an existing key, delete the presence of a key, or add a new key to the registry. In this way, the virtual registry can appear exactly as the system intends. This is important as the presence or absence of a key can be as important as the actual value of the key.

In an embodiment, the Operating System Guard first loads a data file that contains basic registry entries for the application. Then a second data file is loaded that contains the user's preferences. Finally, the Operating System Guard can optionally load a set of keys that include policy items that the user is not allowed to override. The three files load on top of each other with duplicate items in each file overriding items in the file before it. The first time a user runs an application, the second data file will not exist because there will be no user-specific information, only application defaults. After each session, though, the Operating System Guard will save the user's changes, generating that second data file for use in future sessions.

Configuration files can be modified in two ways. First, the file can be edited directly by an application. In this scenario, the Operating System Guard File subsystem described hereinafter will address the modification made to the file. Second, in the preferred embodiment, an application can call the Windows API family of calls GetProfileString, WriteProfileString, or others to modify these files. In this case, the Operating System Guard of an embodiment of the present invention performs exactly as described above intercepting these calls and servicing them from within.

Shared Objects

Many components used by operating systems and running applications are shared across several applications or instances. In general, this is a very good idea. It saves disk space, not requiring many copies of the same file. It also provides the ability for operating system vendors and third parties to create and distribute libraries of commonly used code. On the Windows platform, Dynamic Link Libraries, DLLs, are often shared within and across applications. On other platforms, the problem is the same. On the Macintosh, INITs and other system components are loaded for applications. These components can have many versions, of which only one is used at a time. On UNIX systems, dynamic shared objects, e.g., ".so" library files, are used by applications to speed load time, save disk space, and for other reasons. Many programs use the default "libc. so." However, this library file is typically a symbolic link to some version of itself such as libc.so.3. In practice, this feature has created havoc. These shared components have often gone through revision, with many versions of the same component available to be installed. Application authors have found their software to work with potentially only one or some of the versions of the shared component. Thus, in practice, applications typically install the version they desire, overwriting other present versions. This potentially causes defaults in other applications running on a system.

On Windows 98, Windows 2000, Microsoft has created the Windows Protected File System (WPFS) to allow system administrators to create a file called XXXX.LOCAL in the base directory of an application, where XXXX is the executable file name without the extension. This causes the Windows Loader to alter its method of resolving path references during LoadLibrary executions. This, however, is not sufficient to completely solve the problem. First, setting up the XXXX file is left to the knowledge of the system administrator, which varies widely. Second, a component version must undergo a rewind back to the original, then install this component in the local directory, and then create the ".LOCAL" file. This is not a straightforward process for any but the most basic components placed in WINDOWS\SYSTEM. Also, this solution does not cover all of the needed functionality. During LoadLibrary, Windows uses different path resolution semantics depending on whether the component was resolved as a result of an explicit or implicit LoadLibrary, and also whether a Registry Key exists indicating that it is a named, or well-known, DLL. In this case, the LoadLibrary call will always resolve to the WINDOWS\SYSTEM directory.

DLLs and other shared components also retain reference count semantics to ensure that a component is not touched unless no running applications refer to it. In practice, only applications from the operating system vendor and the operating system itself have done a good job of obeying this protocol.

As a general rule, it is desired to have a shared object always resolve to the correct component. To provide this functionality it is required to understand the version of a component, or range of versions, that an application is able to function with. Then, when the application is to be run, the present invention should ensure that the component is resolved correctly. It is acceptable, in the present invention, to automate the use of WPFS or other operating system provided capability, if desired. In this case, it is necessary to detect needed components and place them in the local file system. This is more complex than just watching installation, as an installation program will often not install a component if the required one is already there.

It is desired to identify a method to ensure that named objects are also loaded correctly. On the Windows platform, MSVCRT.DLL is a significant culprit within this problem area. If multiple versions of this object are maintained, the aforementioned Registry key can be dynamically changed, allowing the LoadLibrary function to resolve the correct component version. Another reasonable method of ensuring correct component loading is the dynamic editing of a process environment to use a valid search path. This search path will ensure that a local component is resolved before a system wide component. Another possible method for resolution of the correct shared object is through the use of symbolic links. A symbolic link can be made for a shared component, which is resolved at run-time by the computer's file system to the needed component. Finally, the actual open/read/close requests for information from a shared object's file can be intercepted by the present invention and responded to dynamically for the correct version of the file which may exist on the local system or within the invention's subsystems.

Several special forms exist. On the Windows platform, OLE, ODBC, MDAC, . . . as well as a number of other vendor specific components, are written to be shared globally among several or all running processes. In the case of OLE, going as far as sharing data and memory space between separate processes. OLE prevents more than one copy of itself running at a time, as do many of these components. OLE also has many bugs and features requiring a specific version to be loaded for a specific application. In the present invention, an application is able to load whatever version of OLE is required, still enabling the shared semantics with other components using the same version of OLE.

In general, unless specifically configured as such, shared objects should be loaded privately to ensure conflict prevention. Nothing about the method used to allow a component to be loaded privately should prevent it from being unloaded cleanly or correctly loading for another software application, whether being actively managed by the Operating System Guard or not. In addition, if the system crashes it is required to recover from this crash to a clean state, not having overwritten or modified the underlying operating system.

Files

Many applications use data files within the application to store configuration entries or other application data. The embodiments of the present invention provide a virtual file system much like the virtual registry described herein before. Before the application starts, an embodiment of the present invention can load a list of file system changes, including files to hide and files to add to the virtual environment or files to redirect to another within the virtual environment. Whenever the application accesses or modifies any files, the Operating System Guard checks if the file must be redirected, and if so, in the preferred embodiment redirects the request to a location specified in the Operating System Guard configuration.

If an application tries to create a new file or open an existing file for writing on a user's local drive, the Operating System Guard must ensure that the file is actually created or modified in the redirected location. If the application is reloaded at a later time, this file mapping must be reloaded into the Operating System Guard virtual environment. When the request is to modify an existing file, which resides on a user's local drive, the Operating System Guard must copy the file in question to the redirection point before continuing with the request. The redirected files may not be of the same name as the original file to ensure safe mapping of file paths. In an embodiment, INI files are handled in this way to offer maximum system security while allowing maximum application compatibility.

An embodiment of the present invention is particularly useful for applications delivered over a network. In such implementations it is important to understand that software applications are made of several kinds of data, where the bulk of the files a software application uses are most preferably mounted on a separate logical drive. Configuration, including both file based and registry based, can be user specific and system wide. The application delivery system used should mark each file for which of these types any file is. This information provides hints to the Operating System Guard system to act on appropriately.

Device Drivers

Many applications use device drivers or other operating system level software to implement some of its functions such as hardware support or low level interactions directly with the operating system. In an embodiment of the present invention, the Operating System Guard provides the capability of dynamically, and as possible privately, adding and removing these components to an application's virtual environment.

Many device drivers are built to be dynamically loadable. If at all possible, it is the preferred embodiment to load all device drivers dynamically. If a device driver requires static load at boot time, the user must be presented with this knowledge before running the application. Once the system has rebooted, the application should continue from where it left off. However, a large percentage of device drivers are not dynamically unloadable. Although it is preferred to dynamically unload the driver, if this cannot be accomplished the driver will be marked for removal on the next reboot, and the user should be made aware of this. If the application is run a second time before the next reboot, the system should remain aware of the presence of the driver and not attempt a second installation, waiting for termination to remark the component removable at next reboot.

It is important to characterize the base similarities and differences, as they exist for each device driver class, to ensure the embodiments of the present invention can correctly function. It is not desirable to load and unload device drivers for system hardware that is constantly present. It should be understood that although this is not a preferred embodiment in terms of programming ease, it is within the scope of the present invention and may be required for specific reasons, such as the restriction in licensing agreements for applications that are delivered and run using the embodiments of the present invention.

On non-Microsoft platforms, device drivers are typically handled very differently. Macintosh systems support both static and dynamic drivers, but they are all installed and removed through the same method. Linking with the Macintosh system folder will provide the necessary support. For UNIX systems, device drivers most typically require a modification to the running UNIX kernel, followed by a reboot. This process can be very complex. In an embodiment, this process is automated; including resetting the kernel once the application is complete. The general parameters of the process are the same as that described above for Windows applications, the actual process steps of compilation and persons familiar with such operating systems can carry out reboot.

Finally, those of skill in the art will understand that it is desirable to be able to recover and remove drivers across system failures. Whatever data or processes necessary to retain system integrity are therefore included in an embodiment of the present invention. Those of skill in the art will also appreciate that all types of device drivers might not be conveniently or efficiently provided via the embodiments of the present invention, most particularly those associated with permanent hardware attached devices.

Other Items

In the embodiments of the present invention, it is recognized that there are several components, the behavior or presence of which is different on alternate operating systems. These components include fonts, processes, environment variables, and others.

Some applications require fonts to be installed in order to perform correctly. Any fonts required will be specified in the Operating System Guard's configuration file. The Operating System Guard will enable these fonts prior to running the application and if necessary remove them afterwards. Most systems have a common area for storage of fonts in addition to a process for registering them or making the system aware of their presence, the Operating System Guard will utilize these available methods.

On Windows, a font is copied to the \WINDOWS\FONTS directory. This however does not guarantee that the font is available to the running program. In the preferred embodiment, if the program uses the Windows API to access fonts, the font will need to be registered with a Win32 API call such as CreateScalableFontResource/AddFontResource. This will insert the font into the system font table. Once complete, the Operating System Guard can remove the font with another appropriate API call like RemoveFontResource, then remove the file from the system. As an alternate embodiment, the Operating System Guard could hook the API functions as described in the virtual registry method. In addition, the Operating System Guard can use its File subsystem to avoid placing the actual font file in the running system.

On Macintosh, the process is extremely similar and based on files in the Macintosh system folder and registration activation. On UNIX, however, the process is dependent upon the application. Most typically, font resources are added to the system as regular files resolved in the proper location, so they can be accessed by name. With many Motif systems, a font description needs to be placed into a font resource file, which will allow the font to be resolved. The Motif or X application can invoke the font either through the resolution subsystem or by a direct call. Recently, many Motif and CDE based systems utilize Adobe scalable postscript fonts. These fonts need to managed through the Adobe type management system. There are exceptions, however, and as stated above, there are alternates to the Windows or other operating system default font management systems. The Adobe Type Manager provides some alternate interfaces for this process, as do other third party type management systems. In most cases it should be decided whether to support the interface or ignore it. The purpose of Operating System Guard is not to provide a universal layer for all these systems, only to do so for the operating system's own subsystem.

Many applications require environment variables to be set. This is most common on UNIX systems, but is also heavily used by software, which was originally written on UNIX and ported to the Windows operating systems. Applications on the Windows operating systems heavily rely on the DOS PATH environment variable and often set their own application specific entries. On the Windows 9x/Me environments, there are many environment settings, which are applicable as at its core is the DOS subsystem. If an application requires the presence of specific variables, or values to be set in existing environment variables, the required environment variables will be specified in the Operating System Guard's configuration file. The Operating System Guard will set these variables for the application's main process when it is launched. As applications do not typically change environment settings as they operate, the virtual environment will not trap these calls, nor will it provide the full complement of functionality that the registry and configuration subsystem does.

Recovery

In some cases shown in the previous sections, actual modifications must be made to the operating system. This is frequent with device drivers and fonts. In addition, changes can be made to the virtual environment that need to be persisted and available the next time an application is run. It is required that the Operating System Guard system be able to recover from changes to the system, removing the change from the system at its earliest possible opportunity. Alternately, if the system crashes during an application's execution, the Operating System Guard should track enough information to remove any change to the system if it is rebooted or otherwise, and should track the changes made to the virtual environment. In the preferred embodiment, this is implemented as a transaction log, but can in other embodiments be done as some other similar component, which can be read on system startup so that changes can be backed out.

Controlling Virtualization

An important aspect of the invention relates to control of the many facets of virtualization which the Operating System Guard is capable of. In the preferred embodiment there exists an instrumentation program able to ascertain the correct aspects of a software system to control. Also included is a method to allow administrators and end users to view and modify those items to be virtualized by the system.

In the automated program, the application to be controlled is observed in order to gauge the aspects of control. The automated program is capable of performing this task during the installation process of the application, during run-time of the application, or a combination of both. In the preferred embodiment, the Operating System Guard is embedded in a wrapper application. Post installation, or after one or many uses of the software, the wrapper application will query the Operating System Guard for a detailed list of all of its actions. From this list of actions, the wrapper application will create the configuration files required to load and operate the Operating System Guard on subsequent uses.

If used as part of the installation process, the Operating System Guard, in an embodiment, will act as a virtual layer allowing the installation to be entered into its environment only. After the installation, all of the files, settings, et. al. can be dumped for reload later. In this way, the installation will leave the original system intact and will have automatically created the necessary configuration files. When used during use of the application, the Operating System Guard is able to record either differential modifications to the environment, or recodify the configuration files.

The Operating System Guard will pass its information to the wrapper application for post-processing. In the preferred embodiment, in addition to the automatic entries that the system can create, the wrapper application is programmed with operating system specific and application or domain specific knowledge. This knowledge is used to alter the output of the process to reflect known uses of configuration items or other entries. In the preferred embodiment, a rules-based system is employed to compare observed behaviors with known scenarios in order to effect changes to the coding.

The wrapper application is also used as a viewer and/or editor for the configuration output of the process. This editor, in the preferred embodiment, enables a system administrator to add, edit, or delete items or groups of items from the configuration. In observing the configuration through the editor, the administrator can also make replicas of the configuration, changing specific items as needed to effect application level or user custom changes.

Referring now to FIG. 1, an embodiment of the present invention is illustrated functionally. In this embodiment, two sets of application/user data 60 are illustrated. The Operating System Guard 100 keeps the two instances of the application 50 from interfering with one another. In addition, as explained above, the operating system guard 100 serves as an abstraction layer and as such collects commands and communications between the application software 50 and the actual operating system 10 of the client computer. As illustrated graphically by the arrows, certain commands are between the Operating System Guard and the software application, this is in distinction to typical installations where these commands would instead be acted upon by the operating system itself, resulting in changes to the client computer that might not necessarily be what the operator intended. On the other hand, other commands pass through the Operating System Guard and are then transferred to the Operating System itself.

Many software applications are designed to operate in conjunction with one or more additional applications. This can be the case for software such as Microsoft Office, where a set of applications are packaged and sold as one single unit and are often created to work together. This is also evidenced by many software applications which are designed to "plug in" to another application or communicate with it in some way.

While this is common functionality, many software distribution systems have difficulty enabling these inter-relationships to function adequately. This can be due to improper resolution of interdependencies either during packaging of the applications, during integration of the application into an end-user environment, or at run-time.

There exist many forms of software distribution today including Packaged Software Distribution, Electronic Software Distribution (ESD), On-Demand Software Distribution, and several next-generation distribution systems such as the ClickOnce system from Microsoft. Each of these distribution systems exhibit several basic patterns relating to how the software is distributed, how it is installed and removed, and how the software interacts with both the host operating environment and other applications.

Software Distribution

Though software is still available on physical media such as CD-ROM or floppy disks, electronic means of distribution have become prevalent for most forms of software. There are many forms of ESD systems such as those offered by vendors such as Microsoft, Marimba, Altiris and others that are designed for corporate use, and others such as those from Digital River and others designed for Internet or public access networks. ESD systems provide application software to end-users and corporations in the form of installation packages that can be downloaded and installed in some fully or relatively automated fashion. In the use of this software, it has often caused installation problems such as conflicting dependencies or other misconfigurations.

Other software vendors have developed systems for distribution of software as it is used or "On Demand". In these systems, application packages are distributed on an as needed basis to the end-user systems that require use of the software. The software can then be installed and removed on the fly from the target system, or in some cases "virtually installed" whereby the software executes on the end-user system as if it were installed, when in reality it has not been installed. The virtual installation technology ensures the application runs as if it were installed, but insulated the application from the operating environment and other applications.

Several other technologies have been presented to the market, such as Microsoft. ClickOnce or Sun's Java Management Framework. In many of these systems, the problems of installing software are conceptually obviated by preventing software installations from modifying their host environments. This is done by requiring any compliant software to gather all of its configuration from harmless, internal sources such as configuration files, and not using any system wide registry or other application configuration entities. The software is also restricted from requiring setup within the host operating system or modifying its host in any way.

In general, software can then be seen to be either installed in a target operating environment by modification of its host configuration, through virtual installation which simulates the modification but does not actually perform it, or through restriction of environment modification by creation of self-contained software. In these systems, removal of software is tied to how it was installed. If normally installed, it must be backed out by a reversal procedure or uninstallation program. These programs often fail and cause damage to the host environment. For virtual installation systems, the software was never installed, thus there is no need for removal. For self-contained environments, removal is simplified by ensuring a simple uninstallation procedure that can be made non-invasive as well.

The Integration Problem

In all of the described systems and any system for execution of software, the problem exists as to how to characterize and facilitate the possible interaction of one or more software applications with its host environment and/or one or more additional applications to be installed or run in the same environment. Many applications are either designed to work together, intercommunicate, or are designed to work by modifying their host environment. There are many other modes of inter-application association, those described herein are simply used as examplar cases of the problem to be addressed, though the problem is pervasive to all or most known modes.

Applications that are designed to work with one another typically follow one of several patterns. First, many applications are hosts for other applications to "plug in" to. An example of this is Adobe Photoshop or Autodesk AutoCAD which provide an ability for third party software vendors to create extensions to their primary application. In the presence of this plug-in, the Photoshop user interface will appear different to the end-user, containing the new functionality offered by the plug-in. There is no requirement for end-user visible changes. It is simply one mode of operation of a common plug-in.

Alternatively, some programs can simulate the appearance of "plugging-in", by exploiting undocumented interfaces of programs, or otherwise modifying its runtime behavior, though the original vendor did not intend it. Several programs exist which provide wrappers around other software programs, such as embedding the program and its user interface within another. When certain functions are chosen within the wrapper, the host can drive the other application to perform some work. This can also be a loose integration, such as through the creation of a "launcher" program which does not host the other software application, just merely starts it at the user's request.

Several applications use other applications to perform part of their work. Software such as PDA applications use contact managers such as Microsoft Outlook as their data repository for synchronizing contact information. Outlook is not shipped as part of the PDA application, but the software can communicate with it to perform its synchronization task. Many programs utilize Microsoft Word to perform Mail Merge functionality.

Programs can also communicate with one another through standard or proprietary means to perform work. This can be something such as an Remote Procedure Call (RPC) through COM/DCOM, MTS, CORBA, SOAP or other means. This can be a raw TCP/IP communication session, or even something such as an HTTP request. The primary issue at hand here is that the availability of intercommunication can change the manner in which a primary application behaves. As an example, a packet dumper or communications troubleshooting program will often be able to view and format many different communications protocols. However, if you are not in an environment using CORBA, you would not need to configure that protocol. This configuration can be done by detecting whether its host or nearby hosts are configured to use this protocol.

Programs can also loosely interoperate through sharing data files or common databases. This can be through simple file sharing or through compound document interfaces such as OLE or OpenDoc. In the compound document case, a particular compound document would rely on the presence and integration of the software applications which can host the various pieces of its internal document structure. In the case of database systems, the coupling is often very loose, but still requires some configuration to be present to cause the integration.

Finally, many programs can operate differently in the presence of similar operating systems that are configured differently, or can have the purpose of configuring a particular host operating environment or other software application. A simple example program would be TweakUI, a program used to change the configuration of the Microsoft Windows desktop environment and many other aspects of the operating system.

In all of the cases described above, software applications either presume to be alone in their view of the world, or will purposefully function differently in the presence of other applications or host environments. This can present a problem for the software distribution systems discussed. It is most often the case that not all of the possible associations are known at distribution or installation time. Thus, the distribution system must provide a means to adapt to changes.

Once an application is configured for distribution, it must often be reconfigured if the environment changes. Additionally, during configuration all of its associations must be known or it may not be configured properly. In the case of virtual installation environments, the default behavior is to purposefully disassociate any program connections. Thus, a means must be provided to overcome this limitation. Or in the case of self-contained environments, a reasonable means of association must be found that does not violate the container paradigm.

Visibility/Discoverability

In order for two applications to intemperate, they must be visible to one another at some point of time. This can either be through a means of discovery at installation or run-time, or by some manifestation or interface of one program being visible to the other at these times.

The problem of visibility can be fairly complex, as programs will often use non-deterministic, or undocumented means to find one another. Presence can be determined, for example, by looking for the existence of the application to be integrated with. This can be done by searching for one or more of its executable components, searching for its configuration within a common registry such as the Windows Registry, searching for a trace of the application within some common location such as an execution shortcut or its configuration in the UNIX/var/opt or /etc file system locations, searching for one or more of its interfaces at common locations, querying its host operating environment for its existence, or one of many alternate approaches.

For systems such as the virtual installation technology, discovery through these means of search can fail even though the program is configured to execute on the host in question. With the virtual installation technology, there is no trace of the program on the host environment. The only knowledge of its availability exists at a server configured to deliver the application to the host. Also, some virtual installation systems provide host integration to things like the desktop system, thus making only this one form of discovery viable, even though an application is not configured to do its discovery in this way. A virtually installed software component is by default not visible to anything but the actual software itself. Thus, for discovery to be done, an alternate means must be provided to facilitate.

In the case of self-contained environments, the actual manifestation of the software components within the host environment can vary significantly. The Microsoft Click-Once technology, for example, can place the executable components of the software application at a location within the host environment that is hidden from the rest of the system or that can change over the course of its existence.

Discovery can also be done through a central or decentralized repository of software. Systems such as UDDI or JNDI provide a means of discovery of software applications at an interface layer. The existence of a record within UDDI implies the availability of the software at a predefined or dynamic endpoint. In virtual installation technologies, this endpoint can often only exist within the virtual installation environment such that a UDDI query within the environment would resolve an application's existence where it would not outside the environment. Or alternatively, the UDDI or JNDI query would resolve to a dynamic endpoint which is simply a proxy for the virtual application.

The problem of discovery is further compounded by changes at install time and post-install time. If one application is installed on a machine that can integrate with another, but the second application is not installed, it may not configure itself to interoperate. If the second application is subsequently installed, it is often the case that the logic for configuring interoperation is only done at install time of the first software application. Thus, the first application must be re-installed to provide integration.

Furthermore, if an application is configured to integrate with a second application and that second application is removed, the first application must be able to either reconfigure, or handle the removal process. As seen in practice, this is often not the case. The removal of the second application can cause the first program to fail or otherwise behave poorly.

The presence of applications can also be determined at run-time and cause behavior changes to applications. A software application can detect another program by trying to talk to it at known interfaces, looking for its process running on the host, finding one or more of its application windows, or using a broker service such as MTS, CORBA, or DCOM.

Intercommunication

Once applications are configured to intemperate, they must still have a means in which to intercommunicate. In a normal, single user execution environment this is rarely a problem unless something has changed in the host configuration causing execution to fail. However, in virtual installation environments, multi-system environments or in multi-user systems, intercommunication can fail to work properly without additional configuration.

In the normal operating mode of the Operating System Guard, default communication endpoints are retargeted to remove the possibility of conflict with some pre-existing endpoint. Thus, when one application attempts to communicate with another, the communication will fail even though both applications exist and are configured to know about one another. This is a result of a guarantee by the system that each communication endpoint will be retargeted differently. Thus, a system must be provided by the Operating System Guard to coordinate the process of retargeting to ensure communication sessions connect and operate properly.

For multi-user environments, the problem is similar. If a program is to be used by more than one user on the same host, the communication endpoints must be mutable on a per user basis, and retargeted the same for each user. In Microsoft Terminal Services or Citrix MetaFrame, communication endpoints such as semaphores and mutexes are already rewritten to be unique within a terminal session, however multiple instances of the same program in a single session can still manifest this problem. Additionally, standard communication such as sockets, COM, named pipes are consistently global to the machine and not muted in any way, thus causing the problem to occur.

Operating System Integration

Most modern software is designed in some way to integrate with its host operating environment. Desktop class software typically provides program shortcuts or other simple means to access the software product. These shortcuts enable the operating system to display a user interface for running the product. In most cases, server class software provides interfaces for management and simple startup/shutdown configuration.

In all cases, the host operating system must provide some means to access the installed software. Most often, the desktop shell such as the Windows Shell or the UNIX CDE or KDE is used to provide a common look-and-feel and integration points for software. It is the responsibility of the software vendor to install its software in the correct means to integrate with these touch points. Some of these interfaces are simple for things like shortcuts, others are more complex such as context menus that are used when a user right-clicks on the mouse.

There are also management interfaces that allow common commands or user interfaces to be used to manage software and hardware. Things like the Microsoft Management Console or the Microsoft Windows Installer or the Linux rpm database provide common places to find management information within the operating system.

With the presence of software that can be added or removed, virtually installed, or otherwise provided on demand, these interfaces must also be either dynamic or able to be managed dynamically. The operational behavior of the operating system will be made to reflect the nature of its active applications.

Versioning

The problem of integration and interoperation is further exacerbated by the existence of more than one version of a software program or its interfaces. If two programs can communicate and one of the programs has multiple versions, there must be a means to know which version of the program to use. Commonly only one version of the program will operate correctly with the calling program. In this fashion, a dependency is known to exist between the two programs. However, if both versions of the program work correctly, the dependency must be articulated in such a way as to indicate version independence.

Many systems such as the Microsoft COM architecture provide a versioned interface for programs to intercommunicate. In this system, a program interface is given a Globally Unique Identifier, GUID, and one or more names to use to identify itself. In addition, a program can be given a version independent identifier. This identifier implies that a program can communicate with it, irrespective of the program's version.

In practice, these types of identifiers are often mistakenly used when in fact a version dependency exists. Most novice programmers presume that if they use the version independent identifier, it will always resolve to what they are looking for. This leaves the program that has been built to require always functioning correctly with the most current version of the dependent software. If the dependent software has changed, and is no longer compatible even though the version independent interface exists, a problem will occur. It is left up to the software distribution system to resolve these mistakes, which often cannot be resolved.

Alternatively, many programs do not have version dependent or independent interfaces, but nonetheless have version dependencies that are only understood through testing or common practice. A program which drives the user interface of another often expects its Window controls to be at specific physical locations, or to have specific class names. Another version of the same program might not adhere to these expectations. In this case, the driving program can only use the first version of the software correctly.

The converse of this problem also exists. If there is a program which needs to drive another program or communicate with it, and can only do so using a specific endpoint such as the Window class name, the two separate versions of the software to be driven may actually use the same endpoint. In this case it is required to allow the driving program to connect to the correct version of the software at the desired endpoint, but still facilitate the operation of the other version of the software using the same endpoint.

Naming

A significant portion of the problem as stated is a basic problem of understanding names. Names come in many forms and can many very different things in different situations or "contexts."

In a computer system, a named object can be almost anything. A file has a name: "C:\Windows\notepad.exe". A registry key: "HKLM\Software\Microsoft\Windows\CurrentVersion\Run". A named pipe: \\PIPE\ExamplePipe. A font: "Tahoma Bold". A TCP Port for HTTP communications: 80. The name of a table in a database: USERS. Even a globally unique identifier, GUID, is fundamentally a name for some object. In practical use, many other objects are named in such a manner as to make their names significant. The title of a news article, the author of the news article, or its publisher.

Once an object is named, there is an implicit understanding that to locate the object one would use the provided name. If two objects have the same name, some process must be accommodated which resolves the appropriate object in question. If separate applications attempt to utilize a common object, normally the applications will resolve that single object. However, if one application modifies that object, it is often desired to have that modified object no longer used by the second application. Thus, each application would need to have a method to resolve the different objects using the same name, and a means to track the changing objects.

Furthermore, if a named object exists, and that same object exists within a virtually installed application, the virtual application will work by resolving its internal object, hut there still remains the need to locate the virtual object for programs outside of the virtual environment.

Thus, in a network where applications and objects can have variable lifetime, differing meanings over their lifetime, and potential collisions, a unified solution is needed to manage the interactions of these objects. Systems of the current art, such as the JNDI or UDDI rely on system wide registries of information to provide absolute information that does not reflect these characteristics. JNDI queries are able to unite disparate namespaces by creating junction points. However, users of the system are required to deal with naming collisions solely by not doing so. In practice this is very difficult as many systems must have common but different definitions of objects in order to perform their work. The JNDI system provides no means for folding or merging namespaces, nor any means for control of versioning or conflict management.

Contexts

The solution to the problems presented above are solved in the presence of the ability to provide the appropriate configuration, named object or interface in the context of the scenario at hand. The embodiments described herein show a system that a) automatically understands the interdependencies of software programs, b) creates operational contexts in which programs can share and/or modify similar views of their host operating environment, c) controls the enabling or properties of these contexts, and d) facilitates the intercommunication and interoperation of these programs that would otherwise fail.

The embodiments provide methods in which to operate one or more programs in a host operating environment and couple together the behavior of multiple systems in a controlled fashion. In an exemplary system 150 shown in FIG. 5, there may exist one or more computing devices. These devices can be single user 155 or multi-user 156 devices, wherein an operating system and one or more applications will execute. There may also exist infrastructure services 158 such as server systems like database servers, file servers, or other line-of-business application servers, as well as some infrastructure 157 for managing the network and systems.

Figure 6:
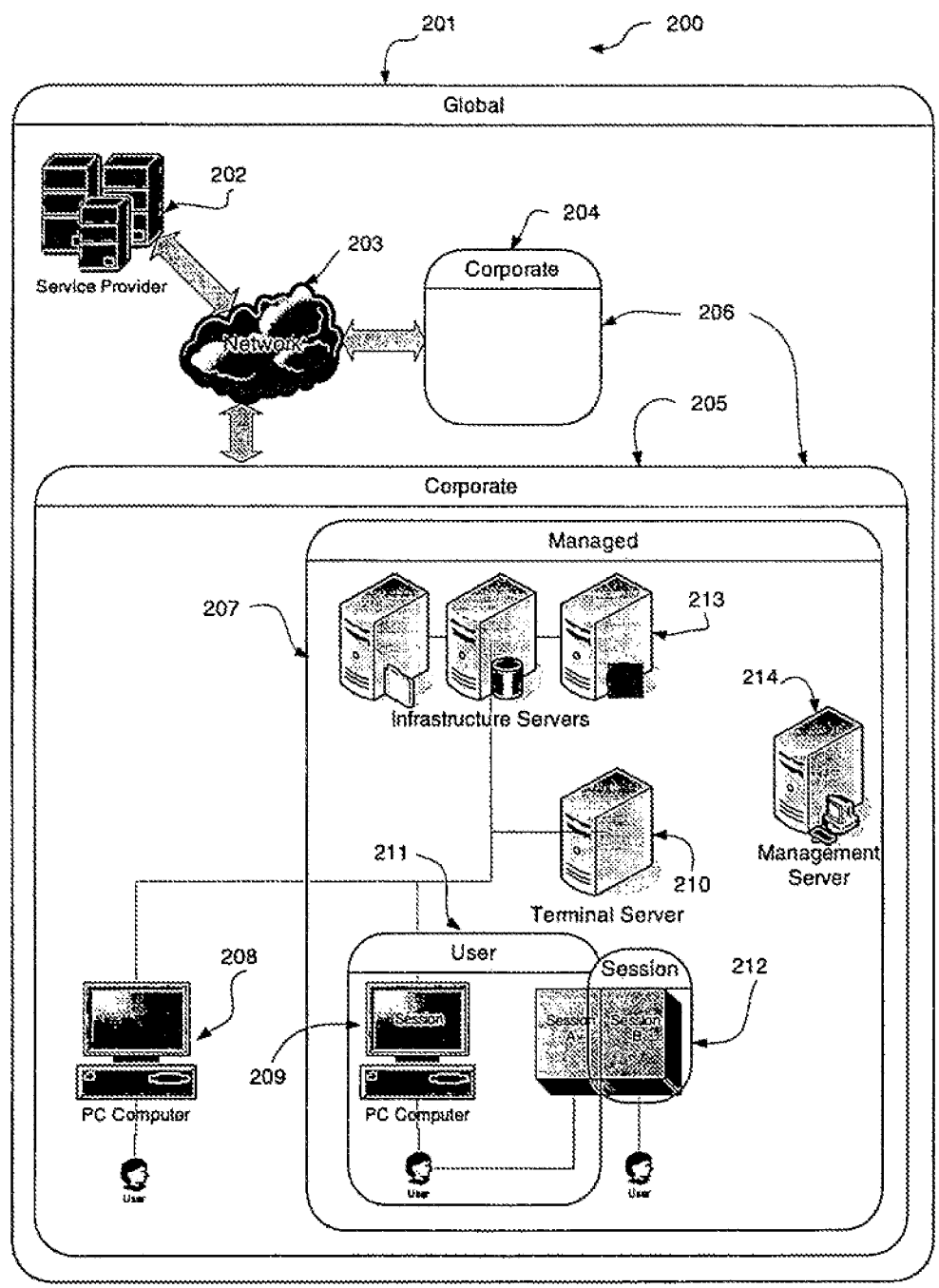
FIGS. 6 and 7 illustrate different contexts in accordance with an embodiment in an exemplary system illustrated with respect to FIG. 5 such as global, managed, local system, system virtual, vendor, user, session, shared and isolated.
Figure 7:
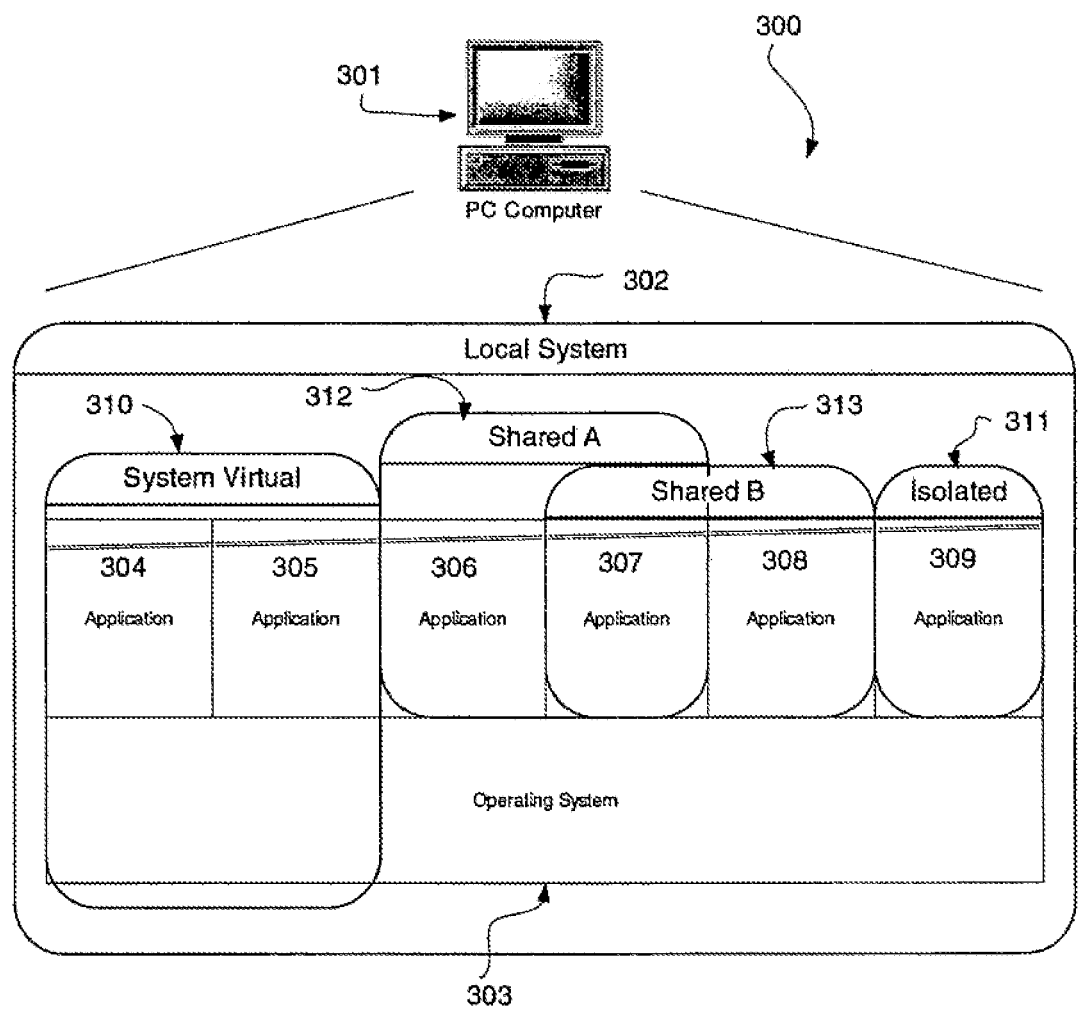

When a software application executes within a network of devices, it will thus have the ability to interact with other software at several levels. In a preferred embodiment, the basic levels include: Global, Managed, Local System, System Virtual, Vendor, User, Session, Shared, and Isolated. These levels are shown in FIGS. 6 and 7. These groupings will be called contexts, corresponding to runtime environments that applications execute within augmented to enable policy based control of cross-environment interaction. Someone skilled in the art will recognize that other contexts can simply be created, those defined herein are meant to be examples of application of the invention.

Figure 5:
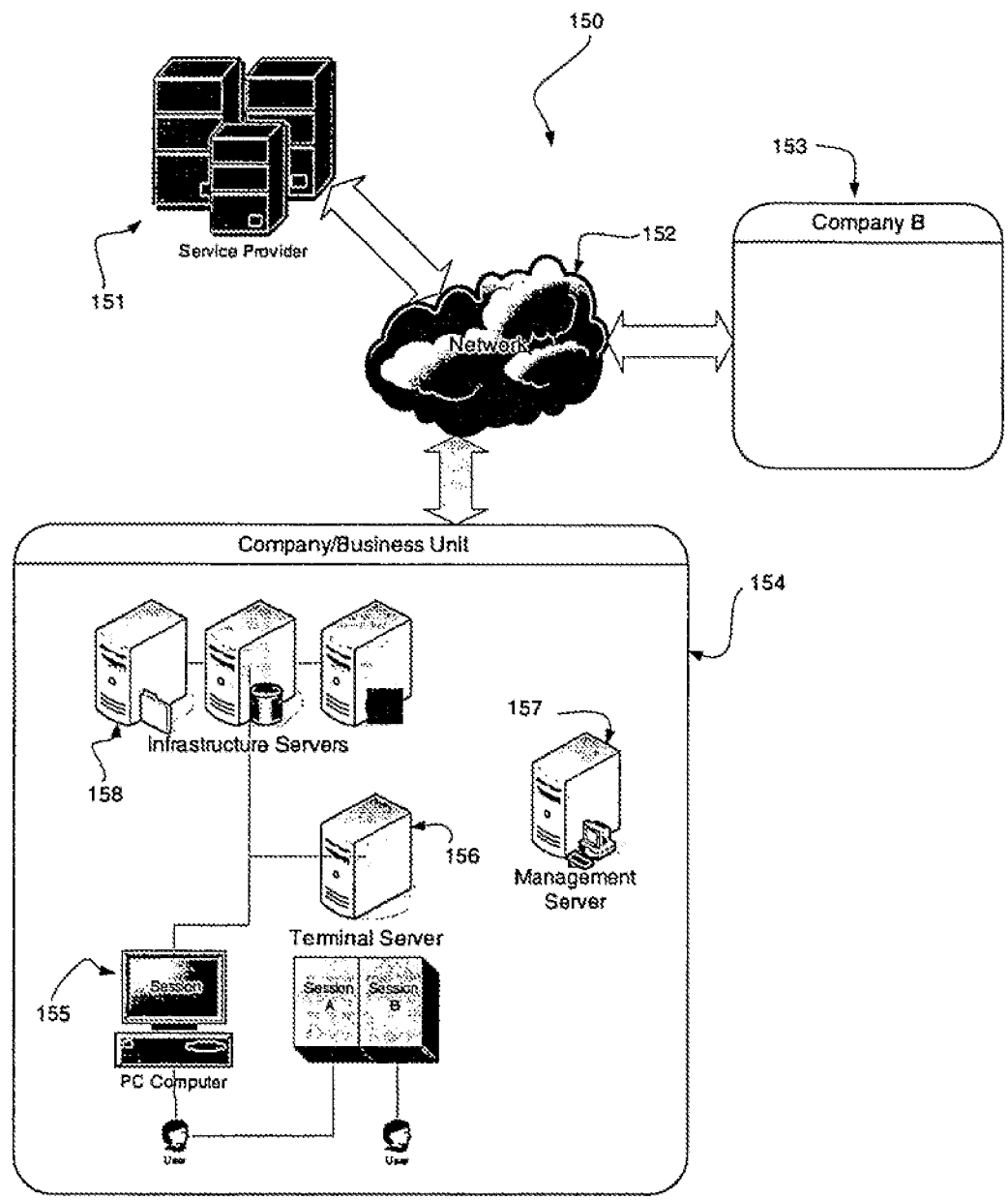
FIG. 5 illustrates an exemplary host operating system including multiple systems having one or more computing devices in accordance with an embodiment of the present invention wherein the view of the entire system corresponds to a global context.

A Global context 201 is the view of the entire system in an embodiment illustrated in FIG. 5. Objects or names that exist within the global context can be seen and shared by all users and all software programs as allowed by security policies. In an alternative embodiment, the Global context could be altered to cover a Corporate context 204 covering all the machines of a company, a Federated context 206 for shared computations between companies, and a Global 201 or Distributed context covering all participating entities.

A Managed context 207 is a wide view of a set of machines, users, resources and/or applications within some scope of management. This scope could be the set of systems managed by a distribution system such as one of the ESD solutions or virtual installation systems 214. It can extend across corporate boundaries within divisions, or if a management system is to be hosted by a service provider 202 such as an ASP, this context can stretch across the provider's customer systems 204 205. This context exists so that any system which implements the methods of the current invention can interoperate with other management systems, and other instances of itself.

A Local System context 302 provides a view of all operations within a specific machine 301 or virtual machine (such as a VMWare partition). This is equivalent to the Microsoft Terminal Services "Global" context. Systems in the prior art from Citrix and Microsoft attempted to resolve some of these contextual issues by subdividing a machine into a Global and Session specific namespace.

A System Virtual context 310 allows programs such as those delivered by virtual installation technologies or the Operating System Guard to share operations and objects with the local operating system such that they both operate within the same namespace. A specific System Virtual context encapsulates one or more applications with the operating system. There is no requirement that all applications share, in the same, way with the OS.

A Vendor context allows a software vendor to create a scope which encompasses all operations that exist within a machine but are related to systems that use their software or hardware. One example in an embodiment is software that is managed by the system that will coexist with other software on the same machine. Within the Vendor context software is grouped based on what is managed and unmanaged.

A User context 211 provides the ability to group operations into those operations done by a user. Note that this context is not limited to existing on one single machine. This context can stretch across multiple machines or sessions that are executing operations on this user's behalf. This behavior allows a user with more than one session running in a network to have coordination between the applications that they are executing.

A Session context 212 limits the operations to one user's operations on one machine. This correlates to the local user namespace of Terminal Services or to a UNIX telnet/tty session in which a user which is logged into a machine will have an identifiable scope.

A Shared context 312, shown in FIG. 7, provides a unique, sharing configuration dependent scope that is administratively defined. This scope enables two or more programs to share configuration and objects or be visible to one another. Within a preferred implementation of this system, there are multiple shared contexts. Each context contains a name and a set of policies that define the sharing behavior. In this way, multiple different segments of applications can share overlapping behavior.

An isolated context 311, shown in FIG. 7, is the default behavior for a virtually installed application. In this scope, an application is completely isolated from all other programs and is in a sense invisible, all normal interfaces and named objects do not exist outside of the context.

These example contexts show how the embodiments of the present invention need not be explicitly hierarchical in design. Though the Operating System Guard operates as a layer between the operating system and individual applications and between applications, there is no restriction that applications or contexts be layered hierarchically. This effect can easily be achieved, but the system of the current invention is able to couple together 1-to-n environments unrestricted by the network or system architecture. This allows contexts to be contemplated such as the User context, which as indicated can span multiple machines.

Operational Characteristics

The system in an embodiment is designed as a software layer which intercepts normal communication of programs with the host operating system, with each other, and within the operating system. In an alternate embodiment, the system is implemented as a code library for compilation into a program specifically enabled to take advantage of the functions of this system. Each individual application request can then be evaluated within its particular operational context. The system will look at all types of requests such as file system requests, registry requests, shared objects, fonts, code libraries, and others. These requests are typically but not limited to configuration items, named objects or communication interfaces, which will be uniformly called resources. Resources have variable lifetime and may or may not be persisted beyond the duration of their use.

Figure 8:
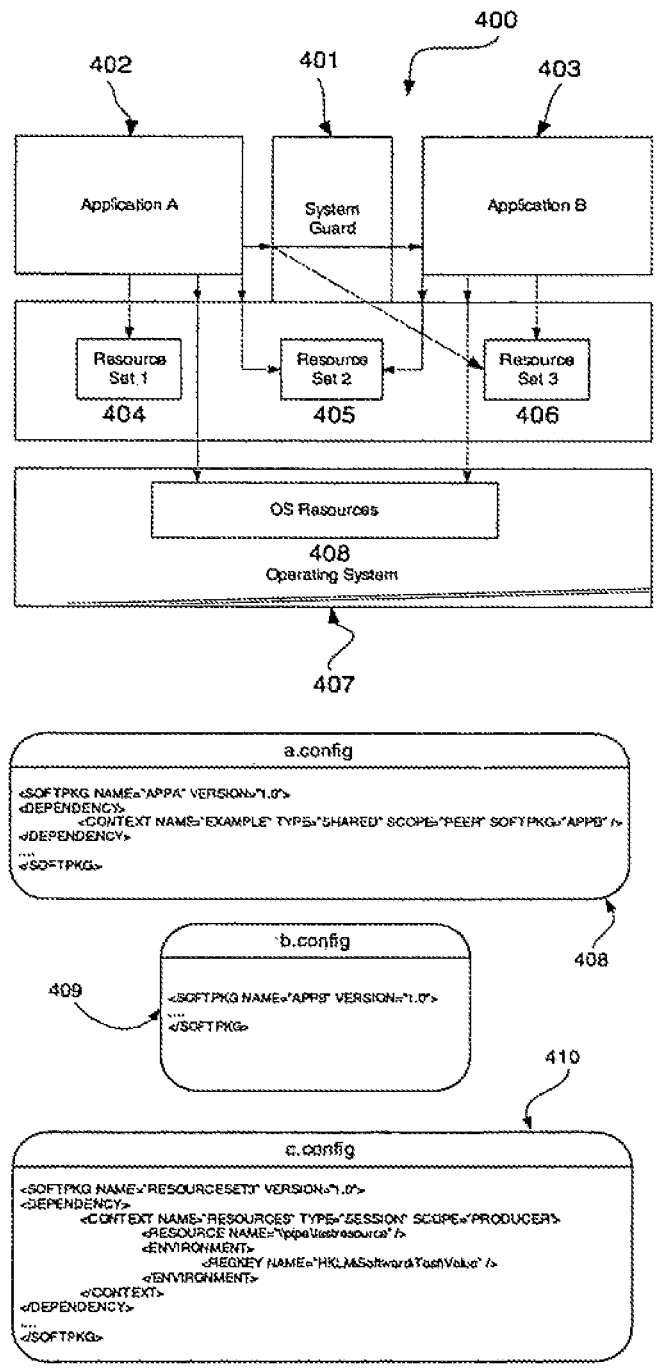
FIG. 8 illustrates a block diagram of two applications utilizing the resources of each other and the operating system and the three different configuration files for the resources in accordance with an embodiment of the present invention.

In the system illustrated in FIG. 8, there are shown two applications utilizing the resources of each other and the operating system. There are three different scenarios shown. One in which a program, Application A 402, attempts to use resources which are configured for use only by itself, Resource Set 1 404. Another scenario whereby Application A 402 attempts to use resources configured for another program, Resource Set 3 406 configured for Application B 403. And finally one in which both programs attempt to access shared resources, Resource Set 2 405, that may be configured for access by each program. Note that this diagram is functionally equivalent to the diagram in U.S. patent application Ser. No. 09/859,209 "Operating System Protection and Abstraction Layer", but is shown to clarify the process.

This diagram shows a basic premise of the system, whereby one or more resources can be configured to be private to an application, or those resources can be shared.

Sharing can be done as a body of resources available, to one or more programs, such as a set of shared libraries. It can also be performed so as to allow one program to share its resources with another. Conversely, privacy ensures that resources of one program are not available to another. In all cases, the intermediary layer is responsible for allowing or disallowing shared operations, or otherwise vectoring the operation to an alternate context.

In an embodiment of the current invention, the resources in each set 404 405 406 are stored in separate namespace container objects. These objects enable separable storage for combinations of namespace types and contexts. An example of a namespace container is a file system container for a user's personal settings (the User context) for Microsoft Office. These containers allow storage of resources to be done in a localized and independent fashion, appropriate for each combination, but then dynamically put into the correct namespace by the functions of the current system. Resources can be persisted in a namespace container, or simply metadata required to recreate the appropriate resource or named object.

One can appreciate that many forms of storage, data structures, etc. can be utilized to achieve this functionality or an equivalent. For example, a namespace container can be a single file containing all of the data and metadata associated with the resource set stored in a local or network file system. In another example embodiment, a namespace container can be a proxy object forwarding requests to underlying or remote systems.

In the system of the current invention, there are three basic models of interoperation. The Producer/Consumer model, in which one application can be providing resource services to another. The characteristics of this model are one way associations where one or more programs can be dependent on another for providing resources or services without a reciprocal need. In this model, a consumer will be restricted in access to the necessary integration points of the producer. Thus, the environment and namespace containers of the producer will not be generally accessible to the consumer, but instead only configured resources or programmatic interfaces will be allowed. An example of this model is the common use of programs such as Microsoft Office for functionality such as the use of Microsoft Excel by Great Plains in order to generate spreadsheets from the accounting data it holds. Excel and Great Plains are useful and functional as independent programs, but together can add this functionality. Great Plains simply needs to programmatically drive Excel, not needing any access to the internal configuration or state of Excel itself.

The second model is a Peer model where one or more programs are able to cooperatively share resources. In this model, sharing is allowed, but modification is tightly and specifically controlled as defined by policy. The environments and resources of the peers will appear to co-exist as one set in a single namespace, but will be handled separately according to the policies defined herein. An example of this model is the shared database driver or Microsoft Office plug-in. A database driver is commonly used by many programs on a machine. In order to function properly these other programs must have access to information concerning the configuration of the driver.

Finally, the system supports a non-interoperation mode where there is no sharing, the default case when no dependencies or contexts have been defined. Alternately, as shown above, an Isolated context can be created which correlates to this mode.

Figure 9:
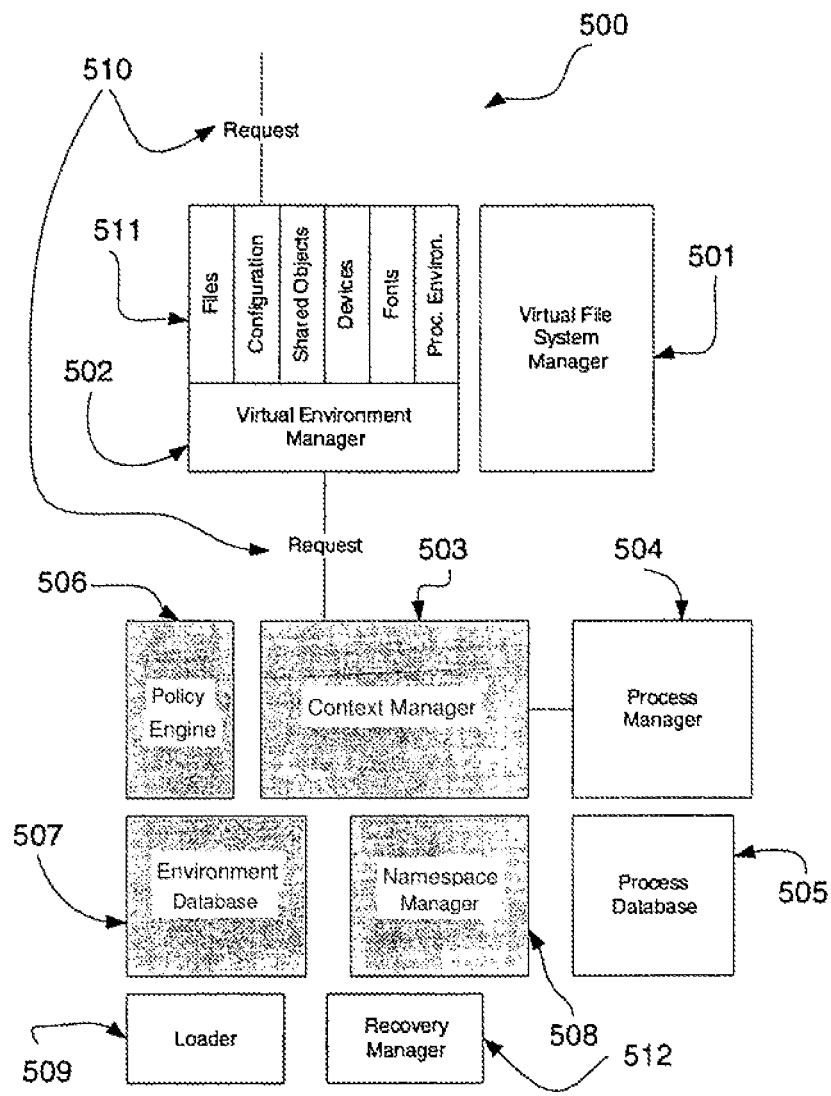
FIG. 9 illustrates a block diagram of a software core used to determine relevant contexts and available scopes in accordance with an embodiment of the present invention.

As the primary program in FIG. 8, Application A 402, is operating, it will make requests for resources. Each of the application requests is evaluated by the software core to determine its relevant context and available scopes. This core is shown in detail in FIG. 9. When a request 510 is received, the Context Manager 503 requests its source to be identified by the Process Manager 504.

The Process Manager 504 is responsible for keeping a view of the processes running on its host, and operations taken by those processes 505. This view correlates to a process tree of parent and child processes and threads. This allows the system to establish a base understanding of which resource pool is the default for a particular process or thread in operation.

The source resolution phase is an important step, as many requests will appear to come from the operating system, when in reality they were sourced by an application. An example of this is a file system call. A write request to a file may be delayed by the operating system, but fulfilled to an application program. Later, when the operating system flushes the write to disk, the request will come from the operating system itself. For context management to work properly, this request must be tied back to its originating program. Another exemplary case is shown where a program does things on behalf of another such as the Microsoft Windows Application Management service. In this case, a program will request that the Windows Application Management service perform some installation task such as registering its components with the host system. A system which looks only at the process owner of a particular request would determine that this activity were part of either the operating system itself, or tie it to the Application Management Service. However, the desired result is that the actions are tied to the program which requested the services to be performed.

In an exemplary implementation of an embodiment of the invention, common interfaces and communication pathways of an operating environment are instrumented. These instrumentation interfaces are used to capture information that is useful for identifying source contexts. As described above, the request interface for the Windows Application Management service is instrumented to identify the calling program of an installation request. The contents of this API call is sent to the Process Manager 504 to store for future use. During the valid lifetime of this API call, the Process Manager 504 can keep this information in a table and use it as a means to lookup the owner of a request.

A request is transmitted through the system as a Request object 510. As stated above this object contains attributes associated with the API call that originated it. Additionally, a Request contains, for example, data about its subsystem, request type (eg. create, query, delete), target, and parent request. In an embodiment, Request objects are implemented as object oriented classes correlating to each category/subsystem of request. This allows each subsystem 511 to store request-specific information without affecting the interfaces of other parts of the invention.

Figure 10:
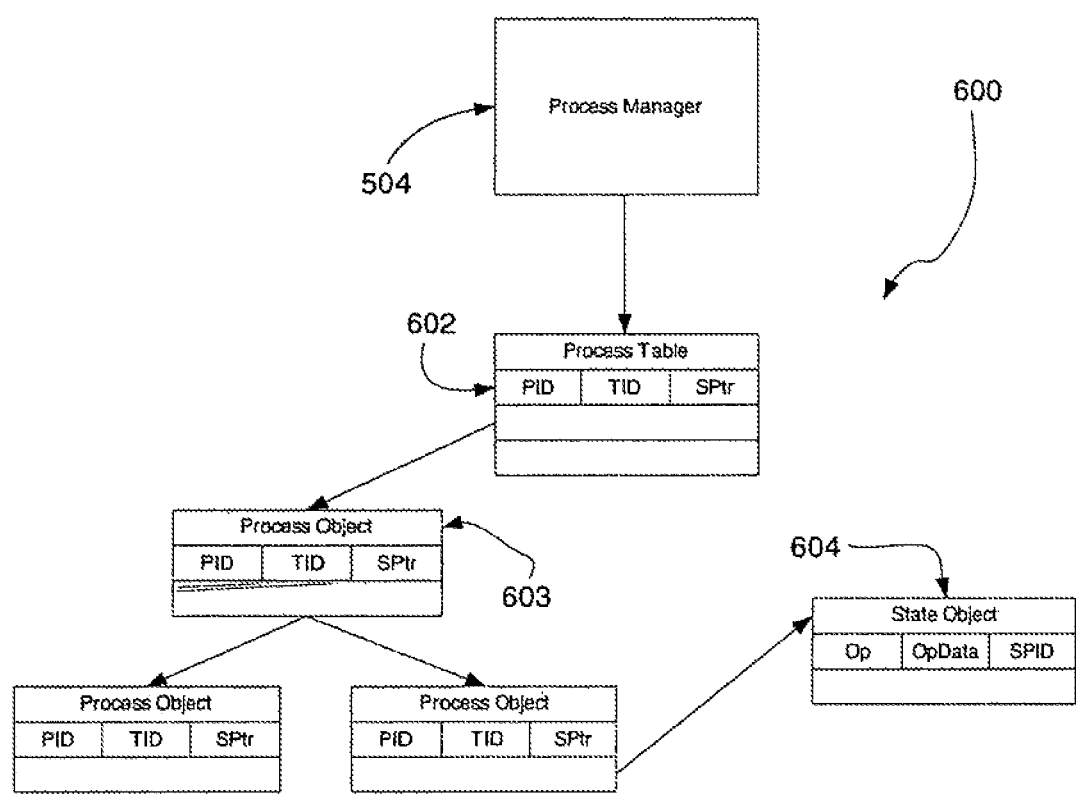
FIG. 10 illustrates a process tree used by a process manager in accordance with an embodiment of the present invention.

When a resolution quest is received, the Process Manager 504 searches its tree of processes, threads, and actions to find a candidate source. This process table 505 is shown in FIG. 10, containing a list of process identifiers (PIDs), thread identifiers (TIDs) and state or action object pointers (SPtrs). Each entry is a process object that can be a parent of one or more process objects. The parent-child relationship mirrors that of the host operating system. Each process object 603 contains pointers to state objects 604 that hold references to past actions if necessary. In the preferred embodiment, each action can consist of an operation, the operations data, and the source process identifier that requested the operation. In practice other data is stored, such as, for example, the result of the operation, success or failure and its result code, timing or lifetime information concerning the operation, and security credentials for the operation.

If a process or thread is associated with an action, the process list is searched to identify if the action matches the current request. In the previous example of the Windows Application Management service, the API call by originating program would cause a state object to be created underneath the Windows Application Management service process object. This state object would identify that the originating program was the source of the requested action. When the Application Management service attempts to fulfill the API request by taking an action such as creating or modifying a file, the Process Manager would find the state object associated with the call under the process object of the Windows Application Management service, but would return that file is actually being created by the originating program using the service.

Figure 11:
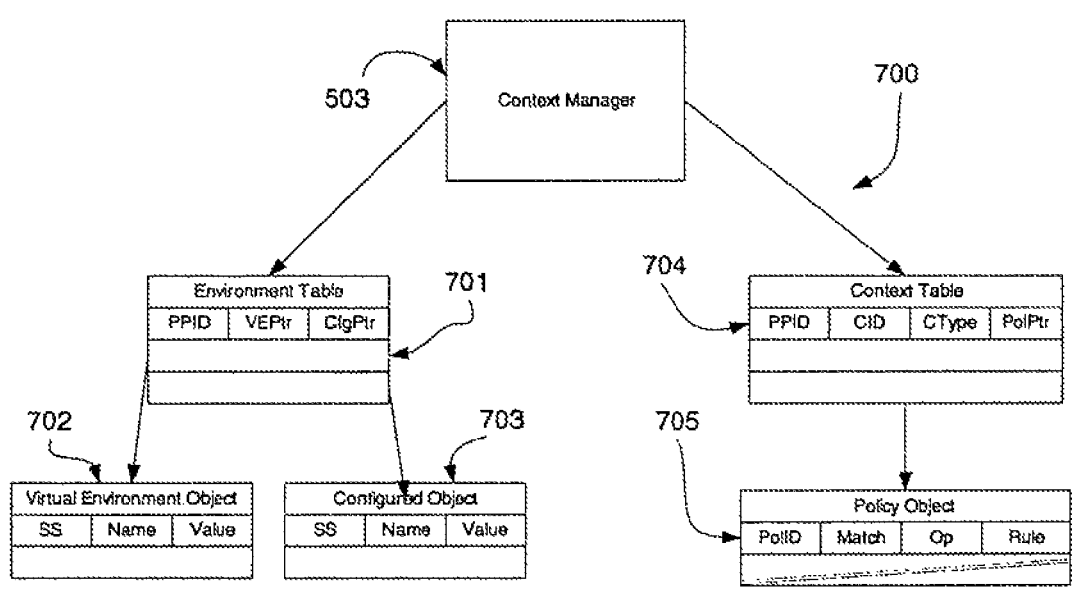
FIG. 11 illustrates a diagram of the context manager which includes a table of the available contexts of a system, as well as the associations between contexts in accordance with an embodiment of the present invention.

Once a request source is understood, the Process Manager 504 will return the process and thread id of the request owner, and its true source though these may be the same, to the Context Manager 503 where it is matched to its one or more contexts. In one embodiment, the Context Manager 503 contains a table of the available contexts of the system, as well as the associations between contexts, as shown in FIG. 11. A context will contain a basic identifier (CID) along with its context type (CType). The context itself then requires a pointer (PoPtr) to one or more policy objects 705 which enable or disable functional interrelation. A policy object will contain its own identifier and a match mnemonic for identifying the machine subsystem(s) as well as request correlation parameters and rules for applying the operations, such as the source namespace container for a resource and transformation operation for the named object. An example policy is any modification, for example, write, delete, etc., to a file that matches, for example, a Microsoft Word file type, (*.doe) that should be made to the local system namespace container. One skilled in the art will recognize that this policy can be codified in various forms.

This table can be built statically and/or dynamically as applications are used in the system and can be done using any technique such as a hashtable, list or otherwise. When an application is started, this table can be loaded to indicate all of the application's associated programs, namespace containers and contextual relationships. The embodiments of the system of the invention also allow the Context Manager 503 to query externally, through a management interface, to load new contexts or respond to changes in system configuration. Thus, if an application is added that is a peer to a running program, its contextual information can be loaded into the live system. Additionally, a Context Manager 503 can notify the external management system through this interface of its running or loaded contexts, so that these can be shared with other machines. One skilled in the art will appreciate that this also can be done directly with another machine.

The Context Manager will feed a candidate list of contexts to the Policy Engine 506. Policies for each context are applied in addition to user, machine or system specific policies to determine the need to resolve the request within a particular context, and to enforce security. This process quickly limits the number of candidate contexts to evaluate a request within. The Policy Engine 506 will be described in more detail in the following section.

The request is then evaluated one or more times within each context by the relevant resource management subsystem, whether file system, registry or otherwise. The results of each request can then be analysed by the Context Manager and a net result returned to the calling process. The Context Manager is able to map the request into the appropriate subsystem through its environment table, where it tracks virtual applications and objects or applications that are being managed, but are fully installed or configured on its host.

In practice there are several classes of operations that need to be managed in this fashion: read, write, query/lookup, create, rename/modify, enumerate and delete. In the preferred embodiment many other operations are handled, it is simpler to describe the basic system model without the particulars of all handled operations. By handling each class of operation separately, the system enables policies to be authored which allow read access to resources, but can deny or vector write access to alternate resources, namespace containers or otherwise.

In a read operation, the system has many options to fulfill the read request. If the read is for a file, this file may exist within one or more contexts. It is up to the Context Manager to determine what to evaluate. One skilled in the art will appreciate that this can be accommodated in several ways. The request can be made in all of the contexts, then determination of which response to utilize or how to combine the responses can be done according to its rules. The request can be filtered by the available contexts and determined which context takes precedence and only make the request within that context. Or as an example, the request can be evaluated within each context successively until some success criteria is met. In the case of the read operation, success may be indicated by the ability of the context to support data for the read operation.

The Context Manager is also able to cache the results of its resolution processing in order to make common requests which follow a pattern not need an entire resolution phase. Additionally, the Context Manager is able to distribute queries through hashing of contexts. This hashing process allows the system to quickly consult its table and query other tables, without performing a full operational query.

The importance of the context approach is seen where the file in the example above may be read from the context of one application program, but when it is written to, the actual write operation occurs within the context of another. This behavior of the system is what can allow two systems to interoperate with one another, but still remain isolated or independent of one another. As described by the Operating System Guard specification, a file which is part of the operating system can be viewed within the context of a running program, but if the program attempts to modify the file, that modification can be kept within the programs context and not filtered through to the operating system.

The same is true of rename and deletion operations. A file that is deleted in one context may be necessary for another. Thus, the system of the present invention holds not only existence information and configuration, but also, for example, tracking information on deletion and renaming.

The querying process is most straightforward. As with the read operation, it can be fulfilled in a layered fashion, through group precedence, or any means the system chooses. However, the purpose of the operation is to validate the existence of or return a handle to a named object within the correct context. The system of the current invention applies the contextual policies to determine what is the correct object, whether it is visible in the current context, and how to manage its scope internally.

In an embodiment of this invention, the system is also able to handle contextual enumeration and interleaved queries. Many data structures or resources within an operating system or its applications are accessed by traversing a tree structure or asking the system for a list of contents of some resource. In practice, these operations require the interleaving of contexts and resources. As an example, an application can have a resource associated with it. However, this resource is only valid if another program is associated with itself and active.

Figure 12:
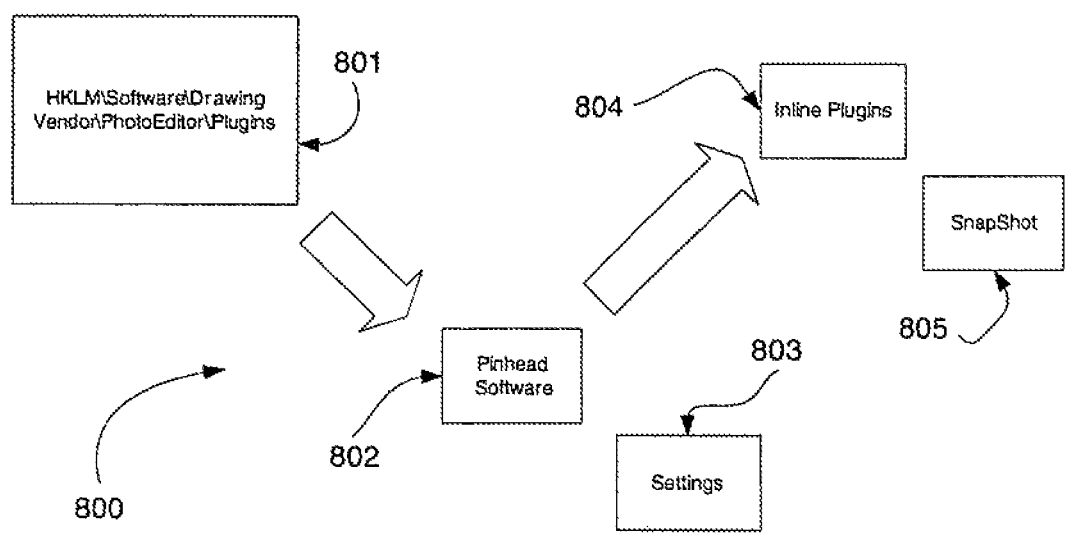
FIG. 12 illustrates a diagram of a resource being attached to a resource tree of another program in accordance with an embodiment of the present invention.

As shown in FIG. 12, a resource may be attached to a resource tree of another program. So, during query for this resource, the system must be able to interleave the namespaces of the two separate configurations. But, if policy does not allow the union operation, neither direct access to the named object, nor enumeration to it will occur. In the example shown in the figure, an application, Application A, is configured with three items representing Windows Registry key objects. The object HKLM\Software\Drawing Vendor\Photo Editor\Plugins\Pinhead Software\Inline Plugins\Snapshot 805 will only exist if the second application, Application B, is configured within a context shared with Application A.

This is even though the object actually exists in Application A. If the item "Pinhead Software" 802 does not exist in the context of Application A, then it can be stranded. The system is designed to fail enumeration to this resource, since there will be no path to follow to it, and to fail direct access to it as well, both unless the secondary application exists. Furthermore, if Application B is instantiated alone, then its resources that are subjunct to the other 802 803 will fail to exist for the same reason.

Namespace Management

In its most basic form, a context is a separate namespace for exposing resources of an application, and a method for persisting operations made on these items. A namespace is a domain or scope within which to map a unique name to some identifiable resource. The Operating System Guard layer is an intermediary that creates and manages this alternate namespace. Applications are unaware of the intermediary. They simply create objects with a given name and expect to be able to reference them at a later time with the same name. The layer manages multiple namespaces, but enables them to appear to be a single namespace to the application executing or the rest of the system. In this way, a single resource presented to operating network 150 can actually be backed by multiple resources from various different namespaces.

By default, the intermediary layer creates an Isolated context by which each program instance that loads has a private namespace. As the application creates and uses resources, the object name will be localized to only exist within the specific application instance. This is typically done by ensuring the object only actually exists within the program's scope, but can also be done by hashing the object name within a larger namespace and being able to retrieve it through a reverse process. In this manner, another program is not able to request objects that do not exist within its namespace, without reverse engineering the functions of the intermediary.

The name that an application uses to reference an object will be referred to as the common name. Two separate applications on a system could use the same common name, but refer to different objects. The intermediary is responsible for creating an instance specific name that corresponds to the correct object. This is called the local name. For each local name, there is an additional absolute name which is unique across the entire system. Every reference to an object using its absolute name references the same object.

Common names are specified by the application. Local names are generated dynamically by the intermediary at runtime by evaluating the common name within its context. The system does not need to generate an absolute name, but may choose to based on the dependencies of the program and its contextual relationships. The application is never informed of the absolute name. It is up to the intermediary to map the local name to the absolute name, as well as the correct common name to local name and vice versa.

In the presence of contexts, two applications in the same context will be able to reference the same object if they use the same common name to create and access the object. It is the responsibility of the intermediary to connect the object requests. There are several methods of connecting these requests. In the preferred embodiment, the intermediary layer often will choose to hash object names in the same context in the same way. Certain other operations can be fulfilled simply by redirecting the request to an object of a different name. For applications in loosely connected contexts, the functions used by the system allow it to utilize a fast searching method to locate the object and make an association between the objects. In the preferred embodiment, a distributed lookup with local result caching is used in order to quickly resolve names.

In an example of the system, a program can attempt to utilize a resource which is available in three locations. First, it is available in the program's primary configuration, as well as a secondary dependent configuration. It is also available as part of the operating system. In our example, we will choose a file MSCOMCTL.OCX. Normally, this resource has a common name of C:\Windows\System32\MSCOMCTL.OCX. Using the Operating System Guard, the intermediary layer allows this name to exist in all three configurations. To all configurations, the objects common name is the same.

The intermediary layer allows the program in question to have a copy of an object with the same name. Additionally, the secondary configuration can have an object with a different name, but in its configuration specify a virtualization command that tells the system that the object's common name is C:\Windows\System32\MSCOMCTL.OCX. This allows the Operating System Guard to store objects in different namespaces or storage locations than they are actually used within, mapping these namespaces at runtime to surface its behaviors.

In this example, all three objects have the same common name. The context resolution process will choose which object takes actual precedence. Then, the system will generate or use a properly localized name. In this case, the system would be able to choose the object in the primary configuration, and choose to map the local name within the context of that program instance.

As the scope of a context gets larger and broader, the system is also able to provide a Namespace Manager 508 function to create, query and retrieve namespace mappings. As a program normally attempts to utilize a resource with a common name, the manager is able to query its list of other programs using a resource with this common name. This can then be used by the Context Manager if any of the additional programs share a context. If so, a mapping can be made to ensure the sharing programs use the same resource. This can be done by enforcing the use of the same local name, or by use of a system absolute name. This is particularly useful for contexts which extend beyond machine boundaries.

Note that this operation can result in the side effect of the Loader 509 retrieving a namespace container and loading the metadata of the resources contained therein. As the resources may have variable lifetime, the Namespace Manager 508 implements resource management operations including reference counting/tracking, loading and finalization of containers, and in some cases speculative virtualization.

Speculative virtualization is a process used during operations such as read and write operations to a file, registry key, or other resource. When a resource is opened or queried, the system may presume that the resource will later be altered and can execute the additional policy to determine what a further operation such as a write may effect in the system. The system may then execute ahead of time or in the background these operations to avoid further cost or latency if they are actually performed. As with all speculative operations, the system must be able to undo the action if the subsequent operation was not performed. In an embodiment of the current invention, the system uses speculative virtualization to assist in avoiding what can be a high cost of copy-on-write operations. When a file is changed, a copy-on-write semantic can incur high cost if the file is large, remote or both. This procedure allows the copy-on-write action to preceed early, in the background, to avoid the runtime cost of the operation.

This Namespace Manager can also operate within the management layer of a system and be the same actual manager that operates within an Operating System Guard, but be configured to answer system-wide queries. Or it can alternatively be a dedicated purpose application. This management function serves to provide a repository of configured absolute names, and map those to large scale contexts.

This Namespace Manager can also manage the time evolution of names within each namespace. This can be used to ensure that a specific object name is hashed the same way each time, even if the standard algorithm for hashing may include a time variable. By doing this, one can provide time-sensitive context or semantics to operations. Additionally, this can be done by storing usage and mapping information within the system.

If an object is requested by a program at one interface in the past, and a new interface of the same name is available, this time-sensitive behavior can ensure that system maps to the old interface. This is done as a default in this system. If it is desired to map to the new interface, one is able to declaratively assert use of the new version. In the presence of a software system with multiple versions, and a system such as that being considered herein, one is able to ensure the creation and use of resources in exactly that manner configured to do so by the author or manager of the software system.

As a relevant example, many systems use distributed function calls such as DCOM or CORBA, or even HTTP RPCs. Two programs can be configured to be dependent on each other, allowing communication to occur. The common name used to connect the programs contains an address and an interface. In the case of DCOM, there is a machine that hosts the distributed query and its COM UID for advertising its interface. The host may have its common name already mapped to a local name. As the remote program attempts to address the host and UID, the system can map both the address and UID to correspond to that local name, or it can activate an alternative host to ensure the proper version of the interface is provided. As indicated above, the mapping of common name used by the remote program to the local name used by the host can be done internally by the system either by looking up the resources absolute name within the Namespace Manager, or by querying the Namespace Manager of the host system for its common to local name mapping. If a secondary version of the interface exists, the Namespace Manager is able to respond with an alternate mapping reflecting the appropriate version for the remote activation.

Context Policy

It was noted above that a suitable mechanism is required to manage the cases wherein operations can span multiple contexts. The nature of these interoperations can cause naming collisions, present cases when it is necessary to decide order of precedence, or situations for resolving effect of change operations. Orthogonal to the existence of the contexts defined above, is the ability of the system administrator, or in cases where desired end-users or software vendors, to establish policies for controlling operations. It is desirable to provide the ability for both macro and micro adjustment of context to enable rapid configuration, but fine-grained control.

An embodiment of the system of the present invention provides a means to describe the interdependencies of applications and operating systems through XML based configuration files. It should be appreciated by one skilled in the art that this process can be accommodated in many ways, only one is described here.

In the system of FIG. 8, Application A has a configuration file a.config 408 while Application B has a configuration file of b.config 409, and a shared resource set described in c.config 410. In order to establish an interdependency between the programs a <CONTEXT> command is placed in the a.config 408 file indicating that the two programs should coexist within a shared context. In this example, the context is a Shared context with a name of EXAMPLE and a context scope of Peer.

In the system, this tag is not required in both programs descriptions in order for it to be used. It is only required that for it to be evaluated, it must have relevance within a particular security domain. Thus, a program which can share with another will not establish a context unless a user has rights to both of the programs.

Further, a system can be provided which assists the understanding and evaluation of contexts. As an example, if a Managed context is desired, it is required by the system to understand which systems participate in the context. This can either be evaluated by each member of the context, or globally by a system-wide service and provided to each machine when evaluating this context. This was described earlier as part of the Context Manager system and its management interfaces. The system of the current invention facilitates this behavior by allowing policy files to be created which describe contextual relations separate from the description of the software packages.

Policy files can be used to create default behaviors of the system, or to establish basic contexts for use by the system. At any time, the system can load or reload a policy into its policy engine for use by its subsystems. Additional modifiers and variables can be applied that allow the policy to only be applied to specific users, groups, machines or other relevant configurations. One could appreciate that any number of variations can be applied to this technique to control the application of these policies, but the basic control is to decide whether or not the context is to be applied and what are its runtime behaviors. A policy can also be digitally signed to ensure its integrity throughout the system, and avoid users authoring policies to alter contextual behavior.

At an individual configuration item level, the system is also able to specify that only a particular resource is exposed to contextual control. This utility is extremely useful where two programs need to communicate and only need to be able to connect their communication interface, but not need to understand any configuration detail. Also, this is useful for corralling the abilities of one program to modify another to a small subset of the overall configuration. In the current example, the shared resource set has declared in c.config that a Session context exists for which it serves as a host for a resource \\pipe\testresource. Any application running in the same session as this resource set can utilize this named resource as well as see its other configuration data at HKLM\Software\Test\Value. In an embodiment of the system, if any specific resources are named, then only those resources are shared. Otherwise, with nothing specified all resources are implied to be shared in accordance with the context directives.

Policy directives are also useful for defining the results of classes of operations. One simple example of this type of directive would be a policy that declares any modification to the Windows Registry should go into the user's personal settings namespace container. These types of policies allow cross-cutting definitions which apply not only to specific applications but multiple contexts and multiple namespaces and containers.

A modifier is also allowed to all context configurations which allow each specification to be read-only or read-write. The default behavior is context specific. Additionally, in the case of allowing writes to a context aware association, it is important to identify which context the write will occur within. This is discussed in more detail later. However, the configuration file can override the system's normal behavior to specify a particular target.

Another modifier provided by the system of the current invention is the ability to override the order of precedence of the established contexts. Any specific relationship can determined to be between peers. In this case it may be natural for the owner of a piece of information to be responsible for its lifetime. However, it may be desired that the program that did the modification only see the modification within itself. If the two programs were within a Shared context, the modification would not have persisted in this fashion. A modifier can force this alternate behavior.

Determining and Controlling Contexts

In order for the system to be practicable, it must provide some automated means of determining the best behavior. By default, the Operating System Guard configures programs to exist in isolated contexts, unless they are explicitly packaged to be within the same context. All programs packaged under the same application environment will share that one context. It is desired, however, to automate further the creation of interoperable contexts as described earlier. The system of the current invention provides several means to detect and configure these contexts and the policies for controlling behavior.

During installation of an application, the system enables the installation to directly configure its target context. In the case of virtual installation software or the Operating System Guard, this is the Isolated context for the specific program. A new configuration environment would be created specifically for the application or set of applications that are installed. By indicating to the system the desire to augment an existing configuration, such as executing an installation program within the context of the pre-existing application, an installation could occur within an environment in an additive fashion.

For software that is distributed and installed in a standard means such as through an ESD system, the software would normally be installed into the Local System context. Contrary to the system of the Operating System Guard, normally application level software and the operating system exist at the same locations within a machine. In the system of the preferred embodiment, the software could be configured to be installed into a separate context selected at installation time. This would normally be one of the Vendor, User or Session contexts depending on the desired behavior, but could be any of the available contexts. As an example, all software from the vendor Microsoft could be installed within a context for Microsoft applications.

Using this method, the system can redirect installed objects to alternate storage locations and create common names to map at runtime. This allows applications to be installed on a machine without damage to the machine or its implied object namespace. The system can also enable installation of software to a retargeted system, virtual machine, simulation environment, or the destination host in order to create a configuration prior to actual installation on a target machine. This allows a virtual environment to be created on-the-fly, not required an a priori step of preparing software for virtual installation.

As described in the prior application, once the installation is complete, the Operating System Guard will download its configuration. During this download, the configuration can be analyzed for certain patterns. These patterns are used to instrument the programs as well as abstract the program from common naming problems. As an example, many programs "personalize" themselves as they are installed and write information about the installing user or the machine in which the program was run on into its configuration. This system removes those local names and replaces them with common names. Or, if the program during its installation created an ODBC DSN, it would be known by the system to create a dependency on the appropriate version of the ODBC subsystem.

These patterns can also be enabled live during the installation. The patterns can be application specific templates, or general rules-of-thumb. An example would be a program that installs into Microsoft Office would search for the HKEY_LOCAL_MACHINE\Software\Microsoft\Office registry key. A system implementing these methods could provide internal rules to implement these templates, or a configurable set of installable templates.

In an embodiment of the system, a program that is searching for Microsoft Office would query for the above named registry key. During that query, if the Microsoft Office software is installed on the local machine, a dependency could be created within the new software package to ensure that Office is present for the program to function, and a context created to ensure that the programs are visible to one another on a local machine. If the Microsoft Office software were part of a virtual installation package, the system would find this registry key within its Namespace Manager and find a list of contexts the new software package may need to intemperate with. It would then be able to create a dependency on the virtual package and create a shared context for interoperation.

In an embodiment of the system, the available software packages are stored in one or more repositories. The configuration and context information is readily queried by the Context Manager of the system. At the time a request is made, that request can be matched against the entire repository for candidate contexts and dependencies. In the case of the Microsoft Office example, the system would not need a template, but instead would resolve the query for Microsoft Office as coming from an application within the repository. The system would then be able to instantiate the Office application and its configuration and create the context and dependencies for the program being installed.

By default, the system attempts to be as restrictive as possible, configuring the least open or shared context as possible with only those resources that are required for sharing. An interface is provided to alter the context policy and configuration, as well as quickly eliminate the resource level commands and set package wide sharing, or change the context.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the diagrams. While various elements of the embodiments have been described as being implemented in software, other embodiments in hardware of firmware implementations may alternatively be used, and vice-versa.

It will be apparent to those of ordinary skill in the art that methods involved in the systems and methods for controlling inter-application association through contextual policy control may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

Other aspects, modifications, and embodiments are within the scope of the following claims.

What is claimed:

1. A system in which resources can be configured to be private to an application or shared among multiple applications, comprising:
a processor;
an operating system (OS); and
one or more storage device having stored executable instructions that are executable by the processor for configuring the system with and/or for utilizing the following:
a first application and a second application;
first, second, and third resource sets, wherein each resource set of the first, second and third resource sets includes one or more resources, wherein the one or more resources in each of the resource sets are stored in separate namespace container objects; and
an OS guard for controlling an interoperation of the applications and resources, the OS guard comprising a core for managing applications and application contexts, a process manager configured to inform the core of process events, and a virtual environment manager including a plurality of virtualization subsystems;
wherein the system is configured to operate in the following modes: (a) a first mode in which the first application is able to use a first resource set configured for use only by the first application; (b) a second mode in which the first application is able to read a second resource set configured for the second application; and (c) a third mode in which both the first and second applications are able to read from and write to a third, shared resource set configured for access by both the first and second applications.

2. The system of claim 1, wherein the separate namespace container objects are further configured to allow storage of the one or more resources to be done in a localized and independent fashion, appropriate for each combination, and to be dynamically put into a correct namespace.

3. The system of claim 1, wherein the OS guard is configured to be employed with the operating system when the operating system includes an underlying system registry, and
wherein the OS guard is further configured to provide a virtual registry to the first and second applications but prevent modification to the underlying system registry.

4. The system of claim 3, wherein the first and second applications are configured to access one or more keys from the underlying system registry by issuing a query for the one or more keys, and wherein the OS guard is configured to respond to the query by providing the one or more keys and one or more corresponding key values, if known by the OS guard, or to alternatively pass the query to the underlying system registry, if not known by the OS guard; and wherein, if an attempt is made to modify a value of a key by a requesting application, the OS guard is configured to allow the modification to occur to only to the key in provided by the OS guard in the virtual registry.

5. The system of claim 4, wherein the OS guard responds to: a command to modify an existing key by modifying the existing key in the virtual registry, a command to delete a presence of a key by deleting the presence of the key in the virtual registry, and a command to add a new key by adding the new key to the virtual registry.

6. The system of claim 5, wherein the OS guard is further configured to load (i) a first data file containing basic registry entries for the first and second applications, (ii) a second data file containing user preferences, and (iii) a third data file containing keys that include policy items a user is not allowed to override.

7. The system of claim 1, wherein the process manager is further configured to provide an abstraction layer for managing a process space and handling thread processing.

8. The system of claim 7, wherein the process manager is further configured to group processes together into application bundles, such that an application bundle comprises a group of processes that share virtual resources with each other.

9. The system of claim 1, further comprising a loader configured to allow virtual environments to be transferred into and out of a running system.

10. The system of claim 9, wherein each of the virtualization subsystems is configured to serialize its configuration for the loader, and wherein the loader is configured for staged loading and/or unloading and combining results of individual stages into a single environment description.

11. The system of claim 1, wherein the plurality of virtualization subsystems includes a configuration manager; a file manager; a shared object manager; and a device manager.

12. The method of claim 1, wherein the method further includes utilizing the process manager to provide an abstraction layer for managing a process space and handling thread processing.

13. A method implemented in a system in which resources can be configured to be private to an application or shared among multiple applications, the method comprising:
- executing an operating system (OS)
- executing a first application and a second application;
- generating first, second and third resource sets, wherein each resource set includes one or more resources, wherein the one or more resources in each resource set are stored in separate namespace container objects; and
- generate an OS guard for controlling an interoperation of the first and second applications and one or more resources, the OS guard comprising a core for managing the first and second applications and application contexts, a process manager configured to inform the core of process events, and a virtual environment manager including a plurality of virtualization subsystems;
- wherein the system is configured to operate in a plurality of modes, including: (a) a first mode in which the first application is able to use a first resource set configured for use only by the first application; (b) a second mode in which the first application is able to read a second resource set configured for the second application; and (c) a third mode in which both the first and second applications are able to read from and write to a third, shared resource set configured for access by both the first and second applications.

14. The method of claim 13, wherein the separate namespace container objects are further configured to allow storage of the one or more resources to be done in a localized and independent fashion, appropriate for each combination, and to be dynamically put into a correct namespace.

15. The method of claim 14, wherein the OS guard is configured to be employed with the operating system when the operating system includes an underlying system registry, and wherein the OS guard is further configured to provide a virtual registry to the first and second applications but prevent modification to the underlying system registry.

16. The method of claim 15, wherein the first and second applications are configured to access one or more keys from the underlying system registry by issuing a query for the one or more keys, and wherein the OS guard is configured to respond to the query by providing the one or more keys and one or more corresponding key values, if known by the OS guard, or to alternatively pass the query to the underlying system registry, if not known by the OS guard; and wherein, if an attempt is made to modify a value of a key by a requesting application, the OS guard is configured to allow the modification to occur to only to the key in provided by the OS guard in the virtual registry.

17. The method of claim 16, wherein the OS guard responds to: a command to modify an existing key by modifying the existing key in the virtual registry, a command to delete a presence of a key by deleting the presence of the key in the virtual registry, and a command to add a new key by adding the new key to the virtual registry.

18. The method of claim 17, wherein the OS guard is further configured to load (i) a first data file containing basic registry entries for the first and second applications, (ii) a second data file containing user preferences, and (iii) a third data file containing keys that include policy items a user is not allowed to override.

* * * * *